(12) United States Patent
Fleischmann et al.

(10) Patent No.: US 11,396,130 B2
(45) Date of Patent: Jul. 26, 2022

(54) THREE-DIMENSIONAL PRINTING

(71) Applicant: HEWLETT-PACKARD DEVELOPMENT COMPANY, L.P., Spring, TX (US)

(72) Inventors: Carolin Fleischmann, San Diego, CA (US); Rachael Donovan, San Diego, CA (US); Yi Feng, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 67 days.

(21) Appl. No.: 16/964,413

(22) PCT Filed: May 11, 2018

(86) PCT No.: PCT/US2018/032353
§ 371 (c)(1),
(2) Date: Jul. 23, 2020

(87) PCT Pub. No.: WO2019/182627
PCT Pub. Date: Sep. 26, 2019

(65) Prior Publication Data
US 2021/0046699 A1 Feb. 18, 2021

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/264* (2017.08); *B29K 2105/0032* (2013.01); *B29K 2105/0094* (2013.01); *B29K 2995/0097* (2013.01); *B33Y 10/00* (2014.12); *B33Y 30/00* (2014.12); *B33Y 70/00* (2014.12)

(58) Field of Classification Search
CPC ................................. B33Y 10/00; B33Y 70/00
See application file for complete search history.

(56) References Cited

U.S. PATENT DOCUMENTS 5,389,714 A  2/1995  Ohtomo et al.
6,110,411 A  8/2000  Clausen et al.
(Continued)

FOREIGN PATENT DOCUMENTS

DE  102008024288   12/2009
EP     2269808 A1   1/2011
(Continued)

OTHER PUBLICATIONS

Tena et al. "Poly(ether-amide) vs. poly(ether-imide) copolymers for post-combustion membrane separation processes" RSC Adv., 2015, 5, 22310-22318 (Year: 2015).

*Primary Examiner* — Mary Lynn F Theisen
(74) *Attorney, Agent, or Firm* — Dierker & Kavanaugh PC

(57) ABSTRACT

An example of a three-dimensional (3D) printing kit includes a build material composition and a fusing agent to be applied to at least a portion of the build material composition during 3D printing. The build material composition includes composite particles of titanium dioxide at least partially coated with a polyether block amide polymer. The fusing agent includes an energy absorber to absorb electromagnetic radiation to coalesce the composite particles in the at least the portion.

18 Claims, 13 Drawing Sheets

(51) Int. Cl.
  *B33Y 70/00* (2020.01)
  *B29C 64/264* (2017.01)
  *B29K 105/00* (2006.01)
  *B33Y 30/00* (2015.01)

(56) References Cited

U.S. PATENT DOCUMENTS

| | | |
|---|---|---|
| 7,148,286 B2 | 12/2006 | Baumann et al. |
| 7,491,792 B2 | 2/2009 | Monsheimer et al. |
| 7,569,273 B2 | 8/2009 | Bredt et al. |
| 9,421,400 B2 | 8/2016 | Mathieu et al. |
| 2005/0003189 A1 | 1/2005 | Bredt et al. |
| 2006/0189784 A1 | 8/2006 | Monsheimer et al. |
| 2013/0052453 A1 | 2/2013 | Filou et al. |
| 2015/0251247 A1* | 9/2015 | Monsheimer ........... B28B 1/001 425/174 |
| 2015/0150662 A1 | 10/2015 | France |
| 2016/0369098 A1 | 12/2016 | Yasuda et al. |
| 2018/0022923 A1 | 1/2018 | Emamjomeh |
| 2018/0345576 A1 | 12/2018 | Constantinou et al. |
| 2020/0406537 A1 | 12/2020 | Cross et al. |
| 2021/0187838 A1 | 6/2021 | Isobe |

FOREIGN PATENT DOCUMENTS

| | | |
|---|---|---|
| EP | 2001656 B1 | 10/2014 |
| WO | WO-1997017409 | 5/1994 |
| WO | WO-2007114895 | 10/2007 |
| WO | WO-2016175813 | 3/2016 |
| WO | WO-2016200673 A1 | 12/2016 |
| WO | WO-2017069778 | 4/2017 |
| WO | 2017/188965 A1 | 11/2017 |
| WO | WO-2018003379 | 1/2018 |

* cited by examiner

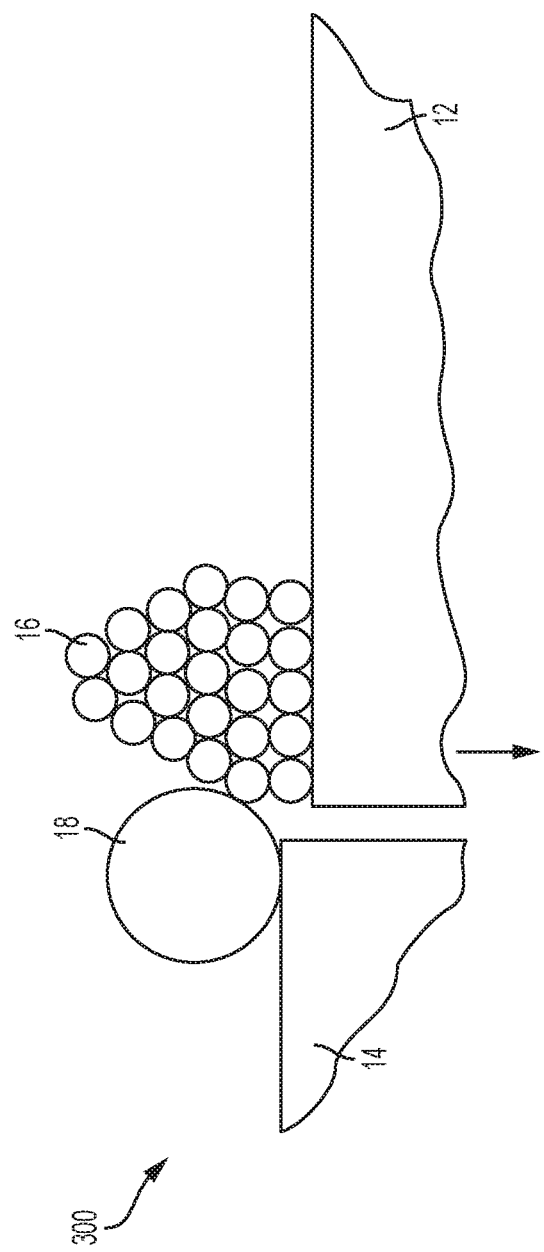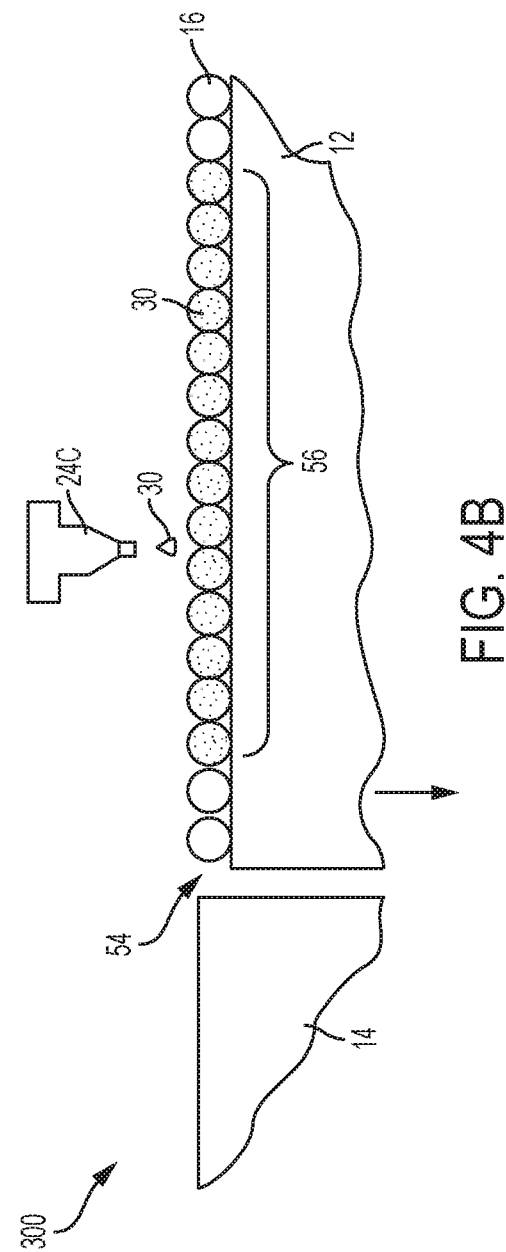

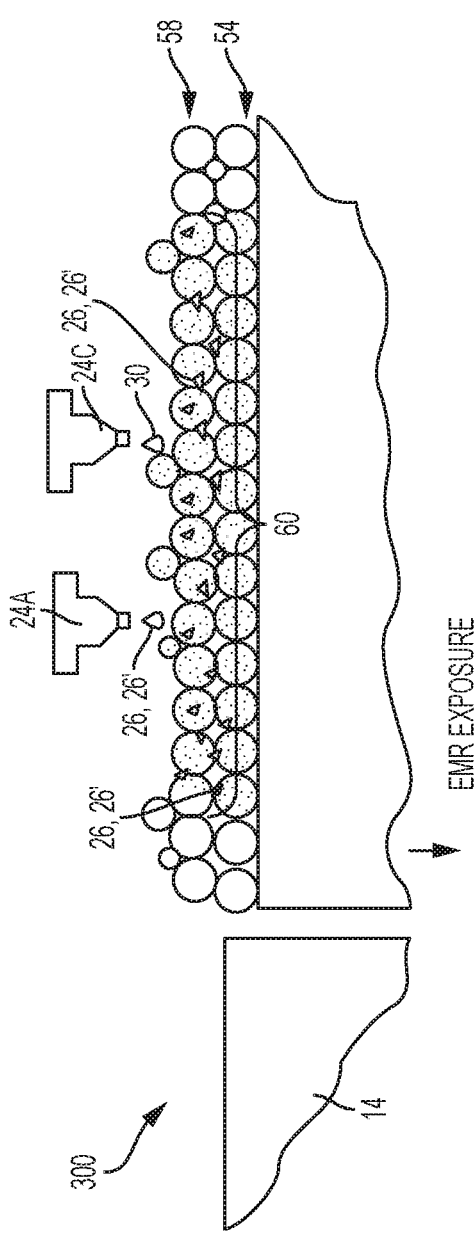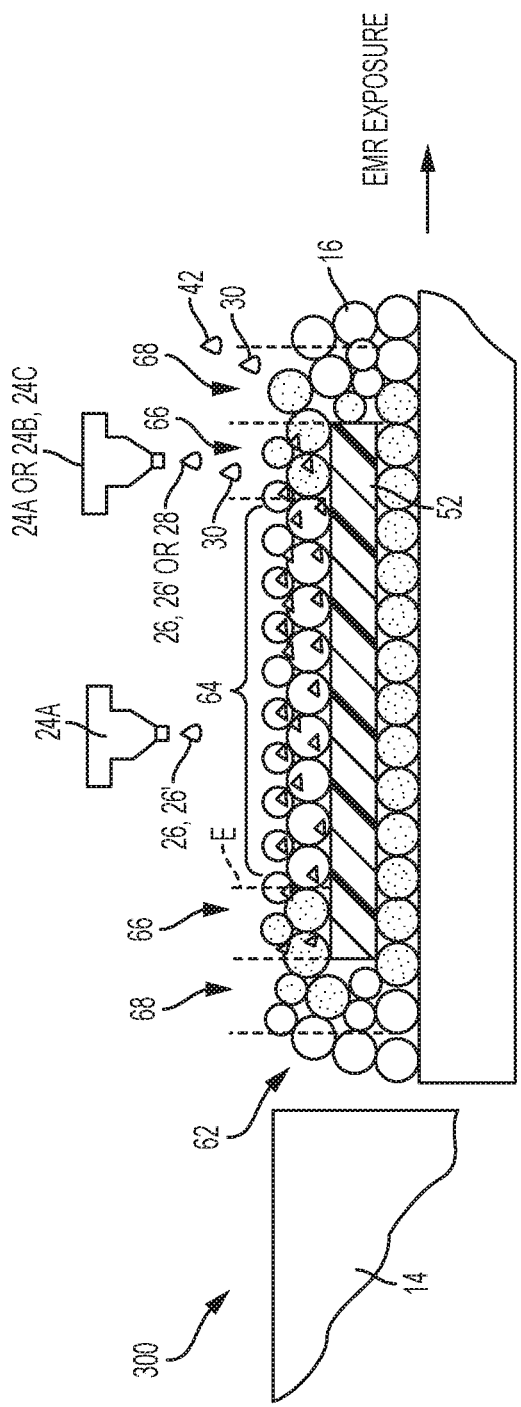

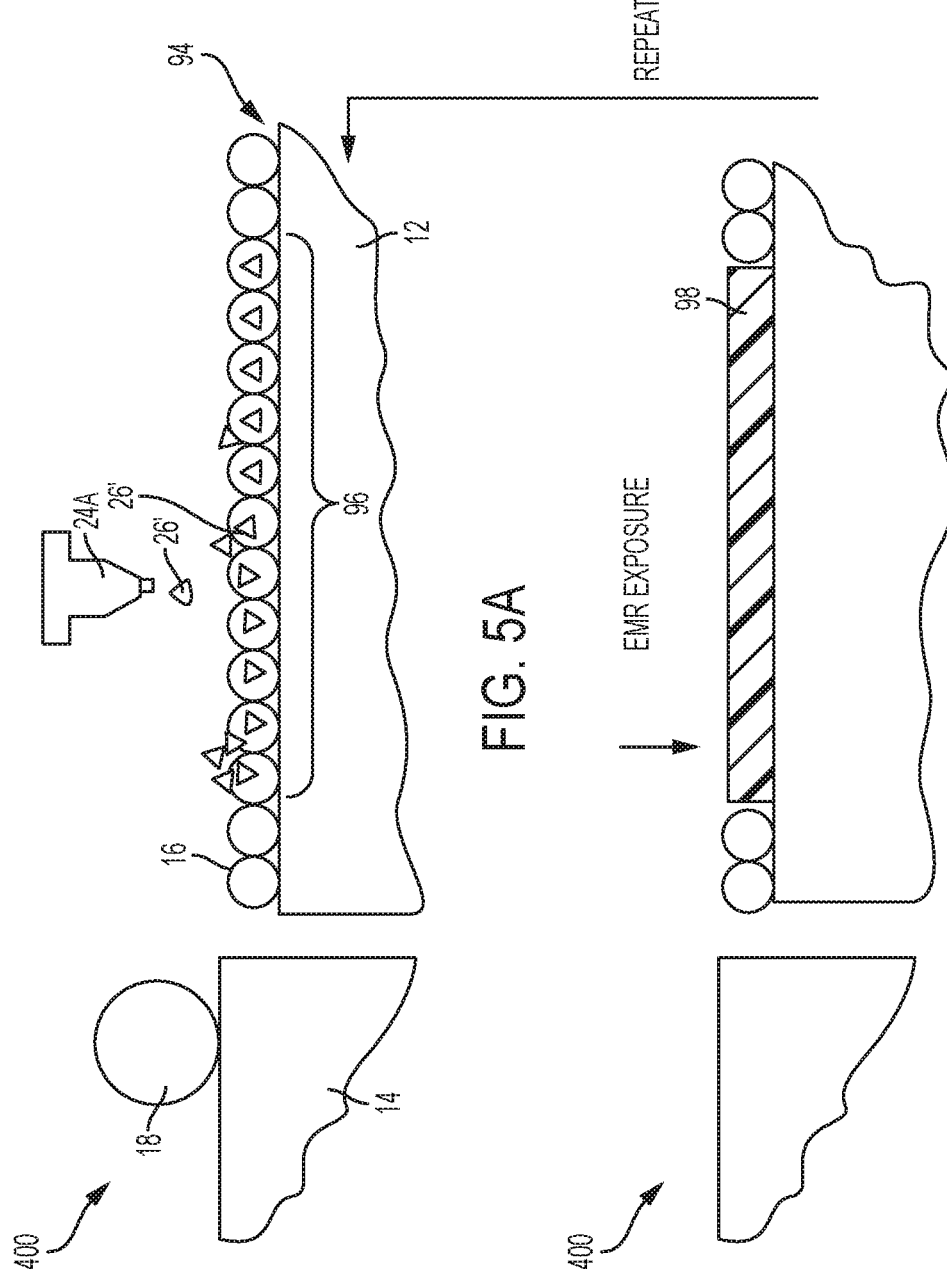

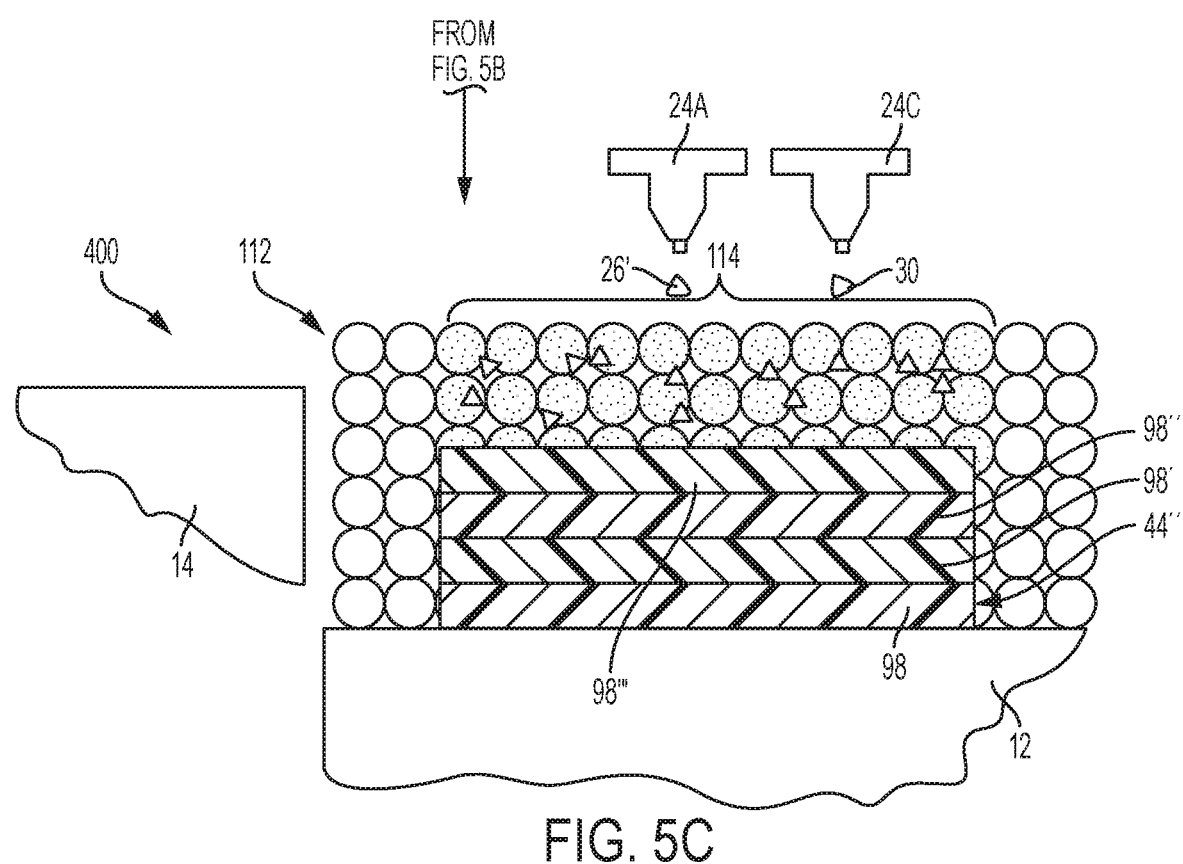

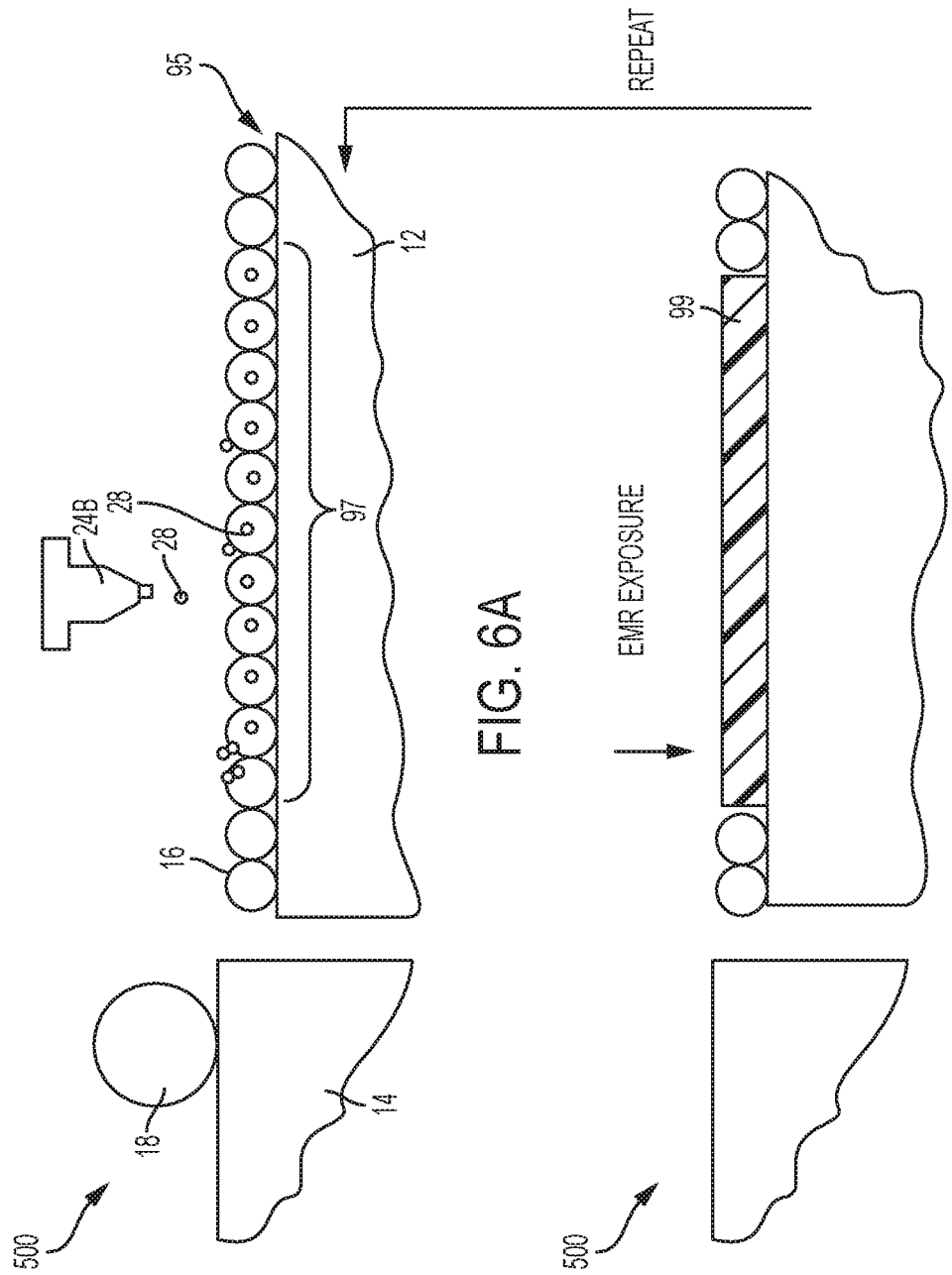

THREE-DIMENSIONAL PRINTING

CROSS-REFERENCE TO RELATED APPLICATIONS

This application claims priority to International Patent Application Number PCT/US2018/024109 filed Mar. 23, 2018, the contents of which are incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 4A through 4H are cutaway, schematic views depicting the formation of a part using an example of the 3D printing methods disclosed herein;

FIGS. 5A through 5C are cutaway, schematic views depicting the formation of a part using another example of the 3D printing methods disclosed herein;

FIGS. 6A and 6B are cutaway, schematic views depicting the formation of a part using still another example of the 3D printing methods disclosed herein;

DETAILED DESCRIPTION

Figure 1:
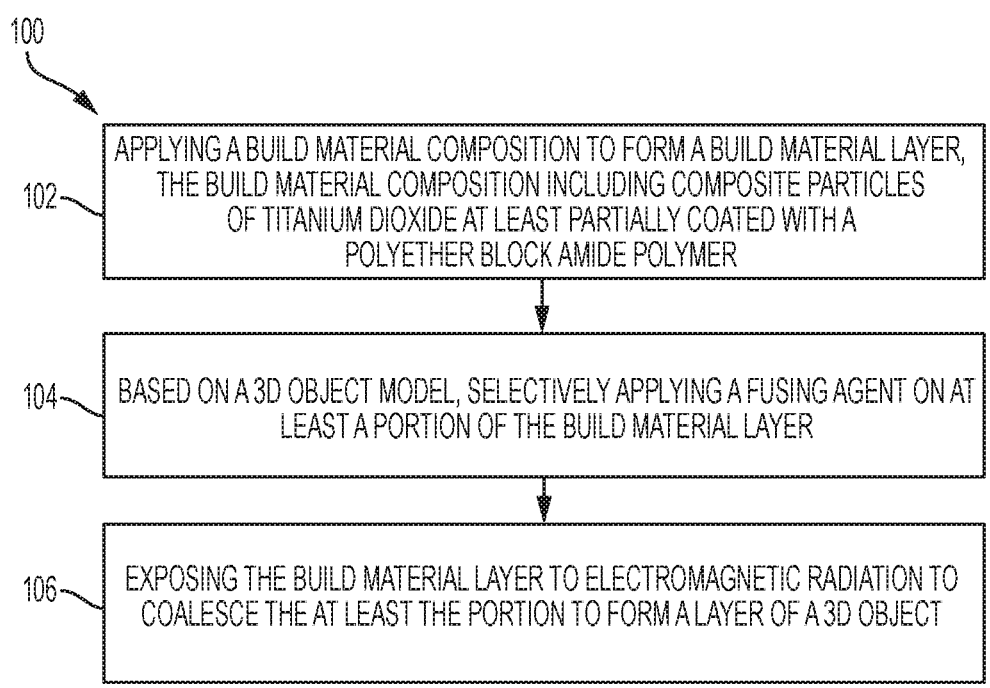
FIG. 1 is a flow diagram illustrating an example of a method for 3D printing.

Some examples of three-dimensional (3D) printing may utilize a fusing agent (including an energy absorber) to pattern polymeric build material. In these examples, an entire layer of the polymeric build material is exposed to radiation, but the patterned region (which, in some instances, is less than the entire layer) of the polymeric build material is coalesced/fused and hardened to become a layer of a 3D object. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn coalesces/fuses the polymeric build material that is in contact with the fusing agent. Coalescing/fusing causes the polymeric build material to join or blend to form a single entity (i.e., the layer of the 3D object). Coalescing/fusing may involve at least partial thermal merging, melting, binding, and/or some other mechanism that coalesces the polymeric build material to form the layer of the 3D object.

In these examples of 3D printing, the entire layer of the polymeric build material may be pre-heated (e.g., to a temperature ranging from about 5° C. to about 50° C. below the melting point or the lowest temperature in the melting range of the polymeric build material). Pre-heating the polymeric build material reduces the amount of thermal energy that is sufficient to elevate the polymeric build material to a temperature within or above its melting point/range (as compared to the amount of thermal energy that is sufficient to elevate the polymeric build material that is not pre-heated to a temperature within or above its melting point/range). In other words, pre-heating reduces the amount of radiation (absorbed and converted to thermal energy by the fusing agent) that is sufficient to coalesce/fuse the polymeric build material. As such, pre-heating the polymeric build material may reduce the energy and time involved in the 3D printing process, which may reduce the cost of the process.

Non-patterned and non-coalesced/non-fused polymeric build material in layers that have been exposed to the full printing cycle (i.e., patterning and fusing) may be maintained at the pre-heating temperature throughout the 3D printing process due in part, to the pre-heating of subsequently applied build material layers, the exposure to radiation, and/or the transfer of thermal energy from the coalesced/fused build material. In some instances, the non-patterned (and therefore, non-coalesced/non-fused) build material may be maintained at the pre-heating temperature for several hours, and thus this build material may be exposed to high temperatures for a prolonged period.

Prolonged exposure to high temperatures in an oxygen-containing environment may result in the discoloration of the polymeric build material. The discoloration of the polymeric build material may be measured in terms of the change in the L* (i.e., lightness) value and/or in terms of the change in the b* (i.e., blue-yellow) value of the polymeric build material before being exposed to heating and after being exposed to heating. The change in the L* value and the change in b* value each corresponds to the amount of discoloration. For example, a larger change in the L* value or in the b* value denotes a larger amount of discoloration (i.e., a more pronounced change in color), and an unchanged L* value or b* value denotes no discoloration. As another example, an increase in the b* value denotes yellowing of the polymeric build material. L* and b* are measured in the CIELAB color space, and may be measured using any suitable color measurement instrument (such as those available from HunterLab).

To facilitate the measurement of the change in the L* value and/or the change in the b* value, the polymeric build material may be subjected to an aging process for a predetermined amount of time at a specific temperature profile. For example, the aging process may include exposing polymeric build material to an air environment that has a temperature of about 125° C. for about 70 hours. As such, the environment used during the aging process may be similar to or slightly harsher than the environment to which the polymeric build material may be exposed during 3D printing. As other examples, a temperature of 110° C., or a temperature of 120° C., or another temperature may be used, as long as the temperature used is below the melting range of the polymeric build material used). The temperature used during the aging process may be similar to the temperature(s) to which the non-patterned build material may be exposed during 3D printing (e.g., a printbed temperature/pre-heating temperature during printing ranging from about 110° C. to about 125° C.). As still other examples, a time period of 5 hours, or a time period of 12.5 hours, or a time period 25 hours, or a time period of 50 hours, or a time period of 75 hours, or a time period of 112.5 hours, or another time period may be used. The time period of the aging process may be similar to the time period of the 3D printing process (or multiple 3D printing processes in which reused/recycled build material may be used). In other examples, the aging time may be extended to compensate for a printing process temperature that is higher than the aging temperature. The conditions associated with the aging process may, without melting the polymeric build material, facilitate the change in the L* value and/or the b* value that the polymeric build material may have exhibited as a result of being exposed to the 3D printing process that utilizes the fusing agent. It is to be understood that the change that the polymeric build material would have exhibited as a result of being exposed to the 3D printing process may be less than the change resulting from the aging process facilitates depending, in part, on the environment, the temperature, and the time period of the 3D printing process.

The change in the L* value may be determined by measuring the L* value of the polymeric build material before and after the aging process, and subtracting the "before" L* value from the "after" L* value. The L* value of the polymeric build material may be greater before the aging process than after the aging process due, in part, to the darkening of the light color of the polymeric build material.

The change in the b* value may be determined by measuring the b* value of the polymeric build material before and after the aging process, and subtracting the "before" b* value from the "after" b* value. The b* value of the polymeric build material may be greater after the aging process than before the aging process due, in part, to the yellowing of the polymeric build material.

Build Material Compositions

Disclosed herein is a build material composition that includes composite particles of titanium dioxide at least partially coated with a polyether block amide polymer. In some examples, the build material composition consists of the composite particles. In other examples, the build material composition may include additional components, such as an antioxidant, an antistatic agent, a flow aid, or a combination thereof.

The composite particles include titanium dioxide at least partially coated with a polyether block amide polymer. In some examples, the composite particles consist of titanium dioxide at least partially coated with the polyether block amide polymer. In other examples, the composite particles may include additional components, such as an antioxidant.

The titanium dioxide ($TiO_2$) may reduce the discoloration (e.g., yellowing) of the composite particles as compared to the discoloration of polyether block amide polymer without titanium dioxide. In an example, the titanium dioxide may reduce the discoloration of the composite particles when the composite particles are exposed to elevated temperatures (e.g., temperatures ranging from about 110° C. to about 125° C.).

Additionally, the titanium dioxide may allow the composite particles to hide (optically isolate) the color of the fusing agent in a 3D object formed therefrom. The polyether block amide polymer may become translucent when it is coalesced/fused. In a 3D object formed using polyether block amide polymer, without titanium dioxide, as the build material (i.e., the polyether block amide polymer is not compounded with titanium dioxide), the color of fusing agent may cause the 3D object to appear darker than desired. The presence of the titanium dioxide in a composite with the polyether block amide polymer may increase the whiteness and opacity of the coalesced/fused build material, which may allow the coalesced/fused composite particles to hide (optically isolate) the color of the fusing agent. In some examples, the presence of the titanium dioxide may increase the L* value of 3D objects formed from the build material composition disclosed herein (as compared to the L* value of 3D objects formed from comparative build material compositions including polyether block amide polymer and excluding titanium dioxide).

In some examples, the titanium dioxide may increase the whiteness and opacity of the coalesced/fused build material (and therefore, increase the L* value of 3D objects from the build material composition) by scattering incoming light. In these examples, the titanium dioxide may achieve the highest light scattering efficiency when the titanium dioxide has a particle size equal to half the wavelength of the incoming light (i.e., $\lambda/2$). As such, the titanium dioxide may be in the form of nanoparticles so that the titanium dioxide may efficiently scatter visible light. In an example, the particle size of the titanium dioxide nanoparticles may range from about 60 nm to about 800 nm. In another example, the particle size of the titanium dioxide nanoparticles may range from about 200 nm to about 350 nm.

In some examples, the amount of the titanium dioxide present in composite particles may be selected so that any color 3D part (e.g., a black part, a white part, a cyan part, a magenta part, a yellow part, a multicolored part, etc.) may be formed using the build material composition. For example, if white parts and black parts are to be formed from the same build material composition, a moderate amount of titanium dioxide (e.g., ranging from about 1 wt % to about 3 wt %) may be included in the composite particles.

In other examples, the amount of the titanium dioxide present in composite particles may depend, in part, on the color of the 3D object to be formed and/or the desired L* value of the 3D object to be formed. For example, if a light or white colored part is to be formed, a higher amount of titanium dioxide (e.g., 10 wt %) may be included in the composite particles. As another example, if a dark or black colored part is to be formed, a lower amount of titanium dioxide (e.g., 0.5 wt %) may be included in the composite particles.

In an example, the titanium dioxide is present in an amount ranging from about 0.5 wt % to about 10 wt % based on a total weight of the polyether block amide polymer. In another example, the titanium dioxide is present in an amount ranging from about 0.5 wt % to about 4 wt % based on the total weight of the polyether block amide polymer. In still another example, the titanium dioxide is present in an amount ranging from about 1 wt % to about 3 wt % based on the total weight of the polyether block amide polymer. In still another example, the titanium dioxide is present in an amount of about 2.5 wt %, based on the total weight of the polyether block amide polymer. In yet another example, the titanium dioxide is present in an amount of about 3 wt %, based on the total weight of the polyether block amide polymer.

The polyether block amide polymer includes hard polyamide blocks, which give the polymer and the 3D printed part formed therefrom strength, and soft polyether blocks, which give the polymer and the 3D printed part formed therefrom flexibility. In some examples, the polyether block amide polymer and/or the 3D printed part formed therefrom may also have comparable or lower density, comparable or greater flexibility, comparable or improved impact resistance, comparable or improved energy return, and/or comparable or improved fatigue resistance, as compared to, respectively, the density, flexibility, impact resistance, energy return, and fatigue resistance of other thermoplastic elastomers and/or 3D objects formed therefrom. Further, in some of these examples, polyether block amide polymer and the 3D printed part formed therefrom may maintain these properties at low temperatures (e.g., −40° C.). In some examples, the polyether block amide polymer and the 3D printed part formed therefrom may have a density of about 1.00 g/cm$^3$; a water absorption at equilibrium (i.e., 23° C. and 50% relative air humidity (RH)) ranging from about 0.4% to about 0.8%; a water absorption at saturation (i.e., 23° C. and 24 hours in water) ranging from about 0.9% to about 1.2%; a Shore D hardness ranging from about 25 to about 72; a flexural modulus ranging from about 12 MPa to about 513 MPa; an elongation at beak ranging from about 300% to about 750%; an impact resistance (Charpy, notched) of no break; and/or an abrasion resistance (10 N/40 m) ranging about 55 mm$^3$ to about 130 mm$^3$. These properties may depend upon the weight ratio of soft to hard may segments in the polyether block amide polymer. Some examples of the polyether block amide polymer may also have electrical properties (e.g., surface resistivity, volume resistivity, etc.), which may be exhibited by the 3D printed part formed therefrom.

The polyether block amide polymer may be produced by polycondensation of a carboxylic acid polyamide (e.g., polyamide 6, polyamide 11, polyamide 12, etc.) with an alcohol termination polyether (e.g., polytetramethylene glycol (PTMG), polyethylene glycol (PEG), etc.). Examples of the polyether block amide polymer may have the chemical formula:

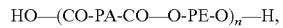

where PA is the polyamide block, PE is the polyether block, where n varies depending upon the molecule weight of the material.

Examples of the polyether block amide polymer include PEBAX® resins (available from Arkema Inc.) and VESTAMID® E (available from Evonik Industries).

In some examples, the polyether block amide polymer has a melting range of from about 130° C. to about 175° C. In some other examples, the polyether block amide polymer has a melting range of from about 134° C. to about 174° C.

In some examples, the polyether block amide polymer does not substantially absorb radiation having a wavelength within the range of 400 nm to 1400 nm. In other examples, the polyether block amide polymer does not substantially absorb radiation having a wavelength within the range of 800 nm to 1400 nm. In still other examples, the polyether block amide polymer does not substantially absorb radiation having a wavelength within the range of 400 nm to 1200 nm. In these examples, the polyether block amide polymer may be considered to reflect the wavelengths at which the polyether block amide polymer does not substantially absorb radiation. The phrase "does not substantially absorb" means that the absorptivity of the polyether block amide polymer at a particular wavelength is 25% or less (e.g., 20%, 10%, 5%, etc.). It is believed that the composite particles will have an absorptivity that is substantially the same as the absorptivity of the polyether block amide polymer.

The relative solution viscosity (or "solution viscosity" or "relative viscosity" for brevity) of the polyether block amide polymer correlates to the molecular weight (weight average or number average) of the polyether block amide polymer. In an example, the composite particles have a solution viscosity at 25° C. ranging from about 1.55 to about 1.80, based on American Society for Testing Materials (ASTM) standards using m-cresol as the solvent. In another example, the composite particles have a solution viscosity at 25° C. ranging from about 1.70 to about 1.80, based on American Society for Testing Materials (ASTM) standards using m-cresol as the solvent. In still another example, the composite particles have a solution viscosity at 25° C. ranging from about 1.55 to about 1.6. In yet another example, the composite particles have a solution viscosity at 25° C. of 1.55. In yet another example, the composite particles have solution viscosity at 25° C. of 1.70. In yet another example, the composite particles have a solution viscosity at 25° C. of 1.75.

The solution viscosity of the polyether block amide polymer may be measured according to American Society for Testing Materials (ASTM) standards using m-cresol as the solvent. Briefly, solution viscosity is determined by combining 0.5 wt % of the polyether block amide polymer with 99.5 wt % of m-cresol (also known as 3-methylphenol) and measuring the viscosity of the mixture at room temperature (e.g., 25° C.) compared to the viscosity of pure m-cresol. The viscosity measurements are based on the time it takes for a certain volume of the mixture or liquid to pass through a capillary viscometer under its own weight or gravity. The solution viscosity is defined as a ratio of the time it takes the mixture (including the polyether block amide polymer) to pass through the capillary viscometer to the time it takes the pure liquid takes to pass through the capillary viscometer. As the mixture is more viscous than the pure liquid and a higher viscosity increases the time it takes to pass through the capillary viscometer, the solution viscosity is greater than 1. As an example, the mixture of 0.5 wt % of the polyether block amide polymer in 99.5 wt % of the m-cresol may take about 180 seconds to pass through the capillary viscometer, and m-cresol may take about 120 seconds to pass through the capillary viscometer. In this example, the solution viscosity is 1.5 (i.e., 180 seconds divided by 120 seconds). Further details for determining solution viscosity under this measurement protocol are described in International Standard ISO 307, Fifth Edition, 2007 May 15, incorporated herein by reference in its entirety.

When the solution viscosity at 25° C. of the polyether block amide polymer ranges from about 1.70 to about 1.80, the interlayer adhesion strength of 3D printed parts formed from the polyether block amide polymer is greater than the interlayer adhesion strength of 3D printed parts formed from a polyether block amide polymer with a lower solution viscosity at 25° C. This greater interlayer adhesion strength of the 3D objects may result in increased ultimate tensile strength, elongation at break, and/or tear strength of the 3D printed parts. The solution viscosity depends upon the length of the soft and hard segments in the polyether block amide polymer. It is believed that, with any base resin, the interlayer adhesion of the 3D printed part will increase as the solution viscosity of the base resin increases until a peak viscosity is reached. After the peak viscosity is reached, the viscosity may continue to increase, however, the interlayer adhesion will decrease. It is believed that the ultimate tensile strength, elongation at break, and/or tear strength of 3D printed parts formed from the polyether block amide polymer may increase until the peak viscosity is reached. As such, when the solution viscosity at 25° C. of the polyether block amide polymer ranges from about 1.70 to about 1.80, the interlayer adhesion strength of 3D printed parts formed from the polyether block amide polymer may also be greater than the interlayer adhesion strength of some 3D printed parts formed from a polyether block amide polymer with a solution viscosity at 25° C. that is higher than the peak viscosity.

In some examples, the composite particles may be formed by compounding titanium dioxide nanoparticles (e.g., with a particle size ranging from about 60 nm to about 800 nm) with the polyether block amide polymer, and then grinding the compounded material. In an example, compounding the titanium dioxide nanoparticles with the polyether block amide polymer includes mixing the titanium dioxide nanoparticles with the polyether block amide polymer, heating to melt the polyether block amide polymer, and extruding the mixture. In this example, the polyether block amide polymer may be melted before, after, or during mixing with the titanium dioxide nanoparticles. Compounding substantially homogenously mixes the titanium dioxide throughout the polyether block amide polymer, and enables the polyether block amide polymer to at least partially coats or encapsulates the titanium dioxide. The compounded mixture is unlike a dry-blended mixture of titanium dioxide and polyether block amide polymer. With dry-blending, titanium dioxide particles may agglomerate in certain portions and be absent from other portions of the mixture, which can lead to undesirable color variations in objects formed from the dry-blended mixture. In contrast, the compounded mixture allows the titanium dioxide to more evenly distribute and remain distributed (by virtue of being coated) throughout the polyether block amide polymer.

The compounded material may be ground to produce the composite particles. In an example, the compounded material may be ground until the desired particle size of the composite particles is achieved. After grinding, the composite remains intact, and thus the titanium dioxide is at least partially encapsulated by the polyether block amide polymer. When spread, the composite particles can form a build material layer having a substantially uniform distribution of titanium dioxide. The substantially homogeneous distribution of titanium dioxide is carried through to the 3D object that is formed, and may allow the 3D object to exhibit a consistent L* value and/or a consistent b* value. The at least partially encapsulated titanium dioxide cannot become airborne during spreading of the build material composition and thus cannot agglomerate, which can also help with color uniformity.

Examples of the composite particles may also be stable and/or non-reactive. As used herein, the terms "stable" and "non-reactive" refer to a material's ability to remain substantially unchanged over time and/or at elevated temperatures. To determine the stability/non-reactivity of the composite particles, the change in solution viscosity may be measured over time, and the percentage of solution viscosity change may be determined. When the change in solution viscosity is within 4% of the original solution viscosity, the composite particles may be considered to be substantially unchanged.

To facilitate the measurement of the change in solution viscosity, the composite particles may be subjected to an aging process for a predetermined amount of time at a specific temperature profile. The aging process to facilitate the measurement of the change in solution viscosity may be the same as or similar to the aging process facilitate the measurement of the change in the L* value and/or the change in the b* value. For example, the aging process may include exposing the composite particles to an air environment that has a temperature of about 125° C. for about 70 hours. The conditions associated with the aging process may, without melting the composite particles, facilitate the change in solution viscosity that the composite particles may have exhibited as a result of being exposed to the 3D printing process that utilizes the fusing agent. It is to be understood that the change that the composite particles would have exhibited as a result of being exposed to the 3D printing process may be less than the change resulting from the aging process facilitates depending, in part, on the environment, the temperature, and the time period of the 3D printing process.

The change in solution viscosity may be determined by measuring the solution viscosity of the composite particles before and after the aging process, and subtracting the "before" solution viscosity from the "after" solution viscosity. After the aging process, the solution viscosity of the composite particles may be substantially unchanged (i.e., within 4% of the original solution viscosity).

In an example, the composite particles have a solution viscosity at 25° C. ranging from about 1.55 to about 1.85, based on American Society for Testing Materials (ASTM) standards using m-cresol as the solvent. In another example, the composite particles have a solution viscosity at 25° C. ranging from about 1.60 to about 1.85, based on American Society for Testing Materials (ASTM) standards using m-cresol as the solvent. In still another example, the composite particles have a solution viscosity at 25° C. ranging from about 1.6 to about 1.7. In yet another example, the composite particles have a solution viscosity at 25° C. of about 1.66. In yet another example, the composite particles have solution viscosity at 25° C. of about 1.67. In yet another example, the composite particles have a solution viscosity at 25° C. of 1.75.

In an example, the aged composite particles (i.e., after the composite particles have been heated to 125° C. for up to 70 hours) have a solution viscosity at 25° C. ranging from about 1.55 to about 1.85, based on American Society for Testing Materials (ASTM) standards using m-cresol as the solvent. In another example, the aged composite particles (i.e., after the composite particles have been heated to 125° C. for up to 70 hours) have a solution viscosity at 25° C. ranging from about 1.60 to about 1.85, based on American Society for Testing Materials (ASTM) standards using m-cresol as solvent. In yet another example, the aged composite particles (i.e., after the composite particles have been heated to 125° C. for up to 70 hours) have a solution viscosity at 25° C. ranging from about 1.60 to about 1.70, based on American Society for Testing Materials (ASTM) standards using m-cresol as solvent. In still another example, the aged composite particles (i.e., after the composite particles have been heated to 125° C. for up to 70 hours) have a solution viscosity at 25° C. of about 1.67. In these examples, after the aging process, the composite particles are cooled to 25° C. and the solution viscosity is measured at 25° C.

Composite particles that are stable/non-reactive may be more suitable for being reused/recycled than less stable and/or more composite particles. As such, when the composite particles are stable/non-reactive, the composite particles may be reused/recycled. After a print cycle, some of the build material composition disclosed herein remains non-coalesced/non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 100° C. to about 130° C. and then cooling), and reclaimed after each cycle. Between cycles, the recycled build material composition may be mixed with at least some fresh or virgin (i.e., not previously used in a 3D printing process) build material composition. In some examples, the weight ratio of the recycled build material composition to the fresh build material composition may be 90:10, 80:20, 70:30, 60:40, 50:50, or 40:60. In another example, the recycled build material composition may be used without mixing it with any fresh build material composition (i.e., the recycled build material composition is 100% of the composition used). The weight ratio of the recycled build material composition to the fresh build material composition may depend, in part, on the stability of the build material composition, the discoloration of the recycled build material composition (as compared to the build material composition), the desired aesthetics for the 3D object being formed, and/or the desired mechanical properties of the 3D object being formed.

The composite particles disclosed herein may include similarly sized particles or differently sized particles. In some examples, the composite particles may have a particle size distribution in which the D90 value (i.e., 90% by volume of the population is below this value) is greater than the D10 value (i.e., 10% by volume of the population is below this value) by about 100 μm. In other examples, the composite particles may have a particle size distribution in which the D90 value is about 3 times greater than the D10 value. The particle size distribution of the composite particles may provide good flowability to the build material composition while allowing fast uniform coalescing/fusing of the build material composition (when patterned with a fusing agent and exposed to electromagnetic radiation).

The term "particle size", as used herein, refers to the diameter of a spherical particle, or the average diameter of a non-spherical particle (i.e., the average of multiple diameters across the particle), or the volume-weighted mean diameter of a particle distribution. In some examples, the particle size may be determined using laser diffraction or laser scattering (e.g., with a Malvern Mastersizer S, version 2.18). In an example, each of the composite particles has a particle size ranging from about 10 μm to about 200 μm. In another example, each of the composite particles has an average particle size ranging from about 50 μm to about 150 μm. In still another example, each of the composite particles has an average particle size ranging from about 60 μm to about 170 μm. In still another example, the D50 value of the composite particles (i.e., the median of the particle size distribution, where ½ the population is above this value and ½ is below this value) ranges from about 70 μm to about 100 μm. In still another example, the D10 value of the composite particles ranges from about 20 μm to about 60 μm. In yet another example, the D90 value of the composite particles ranges from about 130 μm to about 170 μm.

In some examples, the build material composition, in addition to the composite particles, may include an antioxidant, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polyether block amide polymer and/or may prevent or slow discoloration (e.g., yellowing) of the polyether block amide polymer by preventing or slowing oxidation of the polyether block amide polymer. In some examples, the antioxidant may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the composite particles. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

3D Printing Kits and Compositions

The build material composition described herein may be part of a 3D printing kit. In an example, the three-dimensional (3D) printing kit, comprises: a build material composition including composite particles of titanium dioxide at least partially coated with a polyether block amide polymer; and a fusing agent to be applied to at least a portion of the build material composition during 3D printing, the fusing agent including an energy absorber to absorb electromagnetic radiation to coalesce the composite particles in the at least the portion.

In some examples, the 3D printing kit consists of the build material composition and the fusing agent with no other components. In other examples, the kit includes additional components, such as another fusing agent, a coloring agent, a detailing agent, or a combination thereof. The components of the kit may be maintained separately until used together in examples of the 3D printing method disclosed herein.

Any example of the build material composition may be used in the examples of the 3D printing kit. As mentioned above, the build material composition includes at least the composite particles, and may additionally include the antioxidant, the antistatic agent, the flow aid, or combinations thereof. In an example of the 3D printing kit, the titanium dioxide is present in an amount ranging from about 0.5 wt % to about 10 wt % based on a total weight of the polyether block amide polymer. In another example of the 3D printing kit, the composite particles have a relative solution viscosity at 25° C. ranging from about 1.60 to about 1.85, based on American Society for Testing Materials (ASTM) standards using m-cresol as solvent. In still another example, each of the composite particles has a particle size ranging from about 10 μm to about 200 μm.

The fusing agent includes at least the energy absorber. In some examples, the fusing agent is a core fusing agent and the energy absorber has absorption at least at wavelengths ranging from 400 nm to 780 nm. The core fusing agent may also have absorption at wavelengths ranging from 800 nm to 4000 nm. In some of these examples, the 3D printing kit further includes a primer fusing agent including a plasmonic resonance absorber having absorption at wavelengths ranging from 800 nm to 4000 nm and having transparency at wavelengths ranging from 400 nm to 780 nm. In other examples, the fusing agent is a primer fusing agent and the energy absorber is a plasmonic resonance absorber having absorption at wavelengths ranging from 800 nm to 4000 nm and having transparency at wavelengths ranging from 400 nm to 780 nm. Example compositions of the fusing agent (e.g., example compositions of the core fusing and example compositions of the primer fusing agent) are described below.

In some examples, the 3D printing kit further comprises a coloring agent selected from the group consisting of a black ink, a cyan ink, a magenta ink, and a yellow ink. In some of these examples the 3D printing kit may include multiple coloring agents. For example, the 3D printing kit may include a coloring agent for each desired color (e.g., black, cyan, magenta, yellow, etc.). Any of the example compositions of the coloring agent described below may be used in the examples of the 3D printing kit.

In some examples, the 3D printing kit further comprises a detailing agent including a surfactant, a co-solvent, and water. Any of the example compositions of the detailing agent described below may be used in the examples of the 3D printing kit.

As used herein, "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

Fusing Agents

In the examples of the 3D printing kit, the 3D printing methods, and the 3D printing system disclosed herein, a fusing agent may be used.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber in the core fusing agent may also absorb energy in the infrared region (e.g., 800 nm to 4000 nm). This absorption generates heat suitable for coalescing/fusing during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions). In these examples of the fusing agent, the energy absorber may be referred to as the active material.

Other examples of the fusing agent include a plasmonic resonance absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while causing the 3D objects (or 3D objects regions) to be white or slightly colored. In these examples of the fusing agent, the energy absorber is the plasmonic resonance absorber.

As used herein "absorption" means that at least 80% of radiation having wavelengths within the specified range is absorbed. Also used herein, "transparency" means that 25% or less of radiation having wavelengths within the specified range is absorbed.

Core Fusing Agents

Some examples of the core fusing agent are dispersions including an energy absorber (i.e., an active material). In some examples, the active material may be an infrared light absorbing colorant. In an example, the active material is a near-infrared light absorber. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

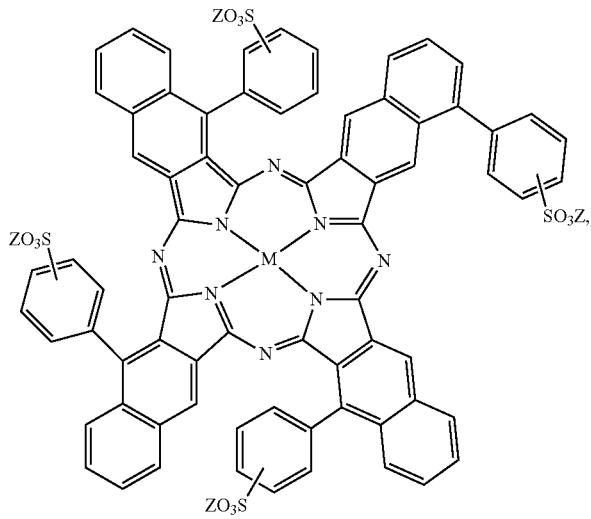

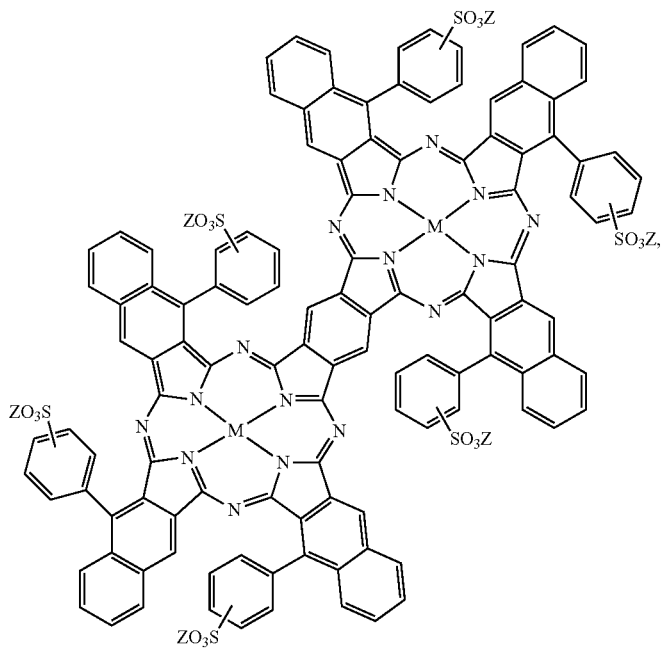

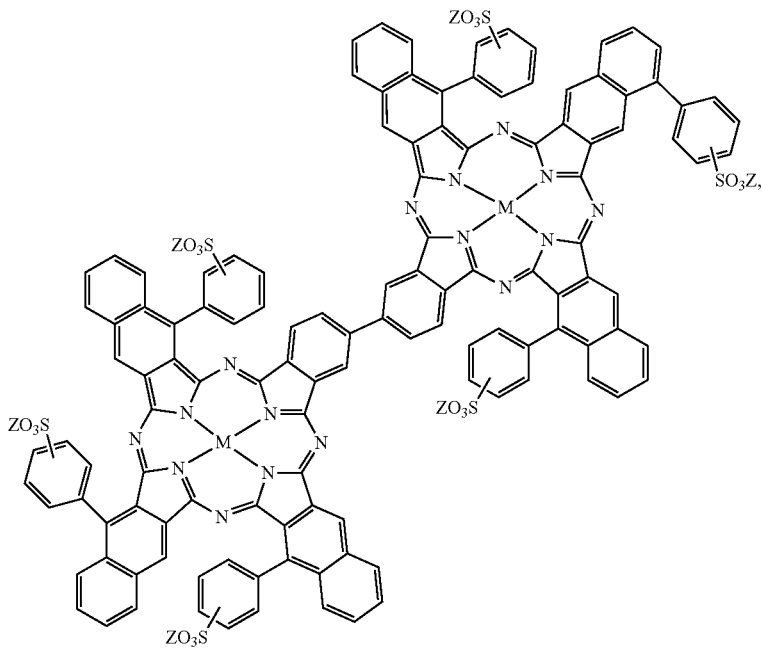

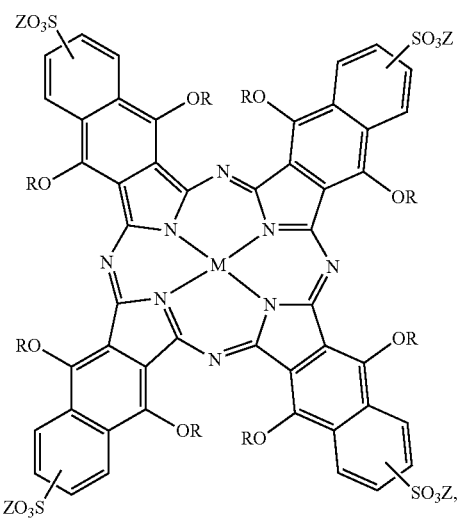

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

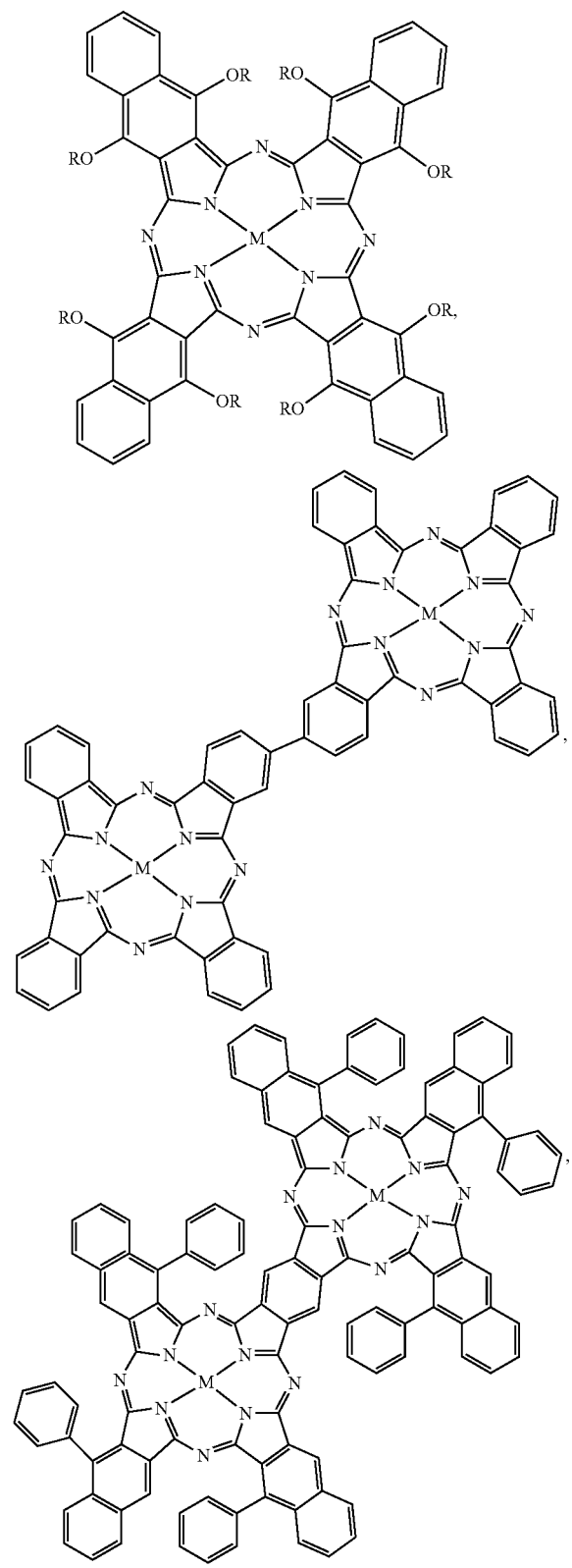

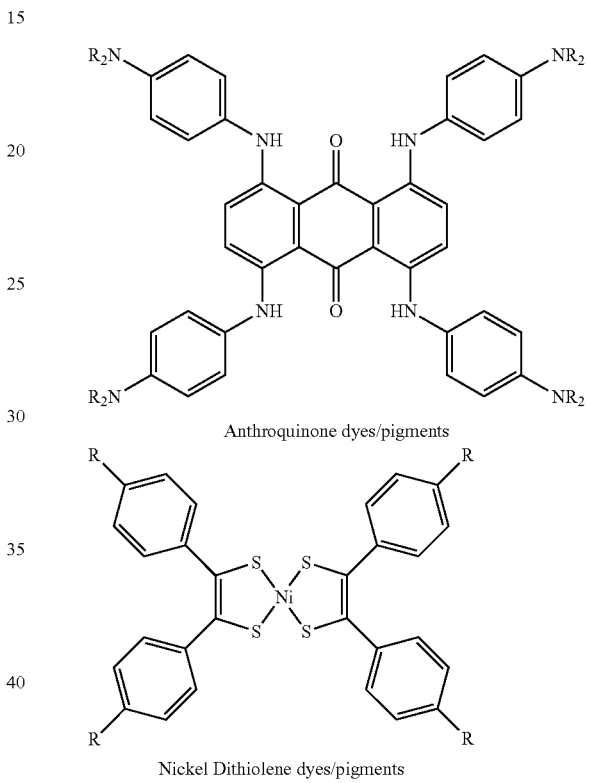

Anthroquinone dyes/pigments

Nickel Dithiolene dyes/pigments and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

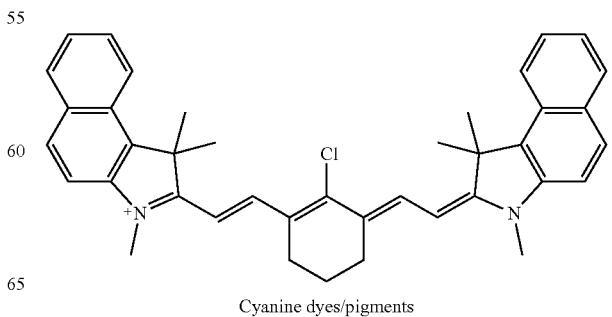

Cyanine dyes/pigments

-continued

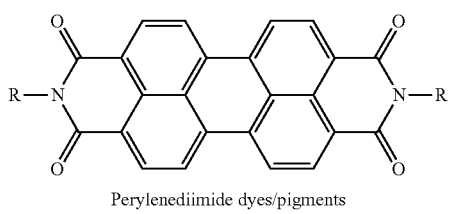

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

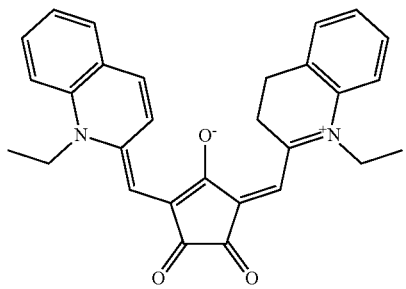

Croconium dyes/pigments

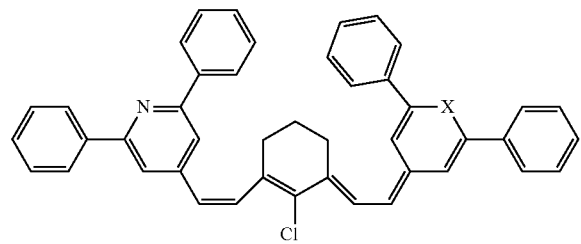

Pyrilium (X═O), thiopyrilium (X═S) dyes/pigments

Boron-dipyrromethene dyes or pigments and aza-boron-dipyrromethene dyes or pigments may have the following structures, respectively:

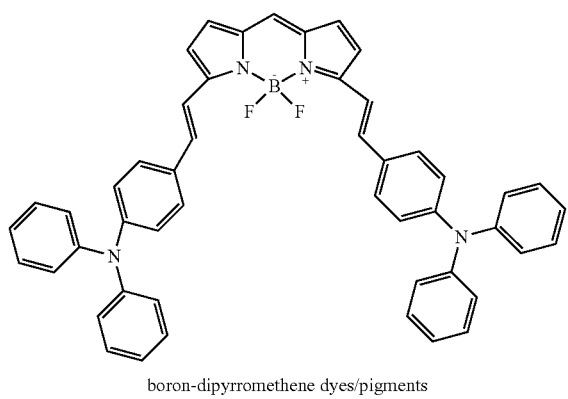

boron-dipyrromethene dyes/pigments

-continued

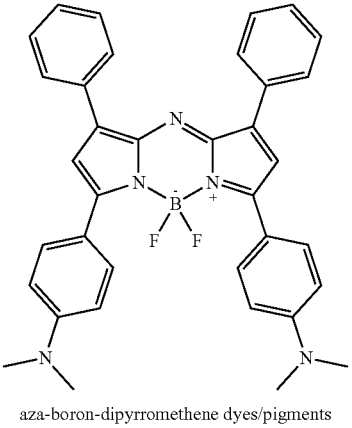

aza-boron-dipyrromethene dyes/pigments

The amount of the active material that is present in the core fusing agent ranges from greater than 0 wt % to about 40 wt % based on the total weight of the core fusing agent. In other examples, the amount of the active material in the core fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the core fusing agent having jetting reliability and heat and/or radiation absorbance efficiency.

Primer Fusing Agents

Some examples of the primer fusing agent are dispersions including the plasmonic resonance absorber as the energy absorber. The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the plasmonic resonance absorber that is present in the primer fusing agent ranges from greater than 0 wt % to about 40 wt % based on the total weight of the primer fusing agent. In other examples, the amount of the plasmonic resonance absorber in the primer fusing agent ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these plasmonic resonance absorber loadings provide a balance between the primer fusing agent having jetting reliability and heat and/or radiation absorbance efficiency.

The plasmonic resonance absorber may, in some instances, be dispersed with a dispersant. As such, the dispersant helps to uniformly distribute the plasmonic resonance absorber throughout the primer fusing agent. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the plasmonic resonance absorber in the primer fusing agent.

A silane coupling agent may also be added to the primer fusing agent to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the plasmonic resonance absorber in the primer fusing agent. In an example, the total amount of silane coupling agent(s) in the primer fusing agent ranges from about 1 wt % to about 30 wt % based on the weight of the plasmonic resonance absorber. In another example, the total amount of silane coupling agent(s) in the primer fusing agent ranges from about 2.5 wt % to about 25 wt % based on the weight of the plasmonic resonance absorber.

One example of the primer fusing agent includes cesium tungsten oxide (CTO) nanoparticles as the plasmonic resonance absorber. The CTO nanoparticles have a formula of $Cs_xWO_3$, where 0<x<1. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include C2 to C8 betaines, C2 to C8 aminocarboxylic acids having a solubility of at least 10 g in 100 g of water, taurine, and combinations thereof. Examples of the C2 to C8 aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the C2 to C8 betaine, the C2 to C8 betaine may be present in an amount ranging from about 8 wt % to about 35 wt % of the total weight of the primer fusing agent. When the zwitterionic stabilizer is the C2 to C8 aminocarboxylic acid, the C2 to C8 aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Fusing Agent Vehicles

As used herein, "FA vehicle" may refer to the liquid in which the energy absorber (e.g., the active material or the plasmonic resonance absorber) is dispersed or dissolved to form the fusing agent (e.g., the core fusing agent or the primer fusing agent). A wide variety of FA vehicles, including aqueous and non-aqueous vehicles, may be used in the fusing agent. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), surfactant(s), antimicrobial agent(s), anti-kogation agent(s), and/or chelating agent(s).

The solvent of the fusing agent may be water or a non-aqueous solvent (e.g., ethanol, acetone, n-methyl pyrrolidone, aliphatic hydrocarbons, etc.). In some examples, the fusing agent consists of the energy absorber and the solvent (without other components). In these examples, the solvent makes up the balance of the fusing agent.

Classes of organic co-solvents that may be used in a water-based fusing agent include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), 1-methyl-2-pyrrolidone (boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent in a total amount ranging from about 1 wt % to about 50 wt % based upon the total weight of the fusing agent, depending upon the jetting architecture of the applicator. In an example, the total amount of the co-solvent(s) present in the fusing agent is 25 wt % based on the total weight of the fusing agent.

The co-solvent(s) of the fusing agent may depend, in part, upon the jetting technology that is to be used to dispense the fusing agent. For example, if thermal inkjet printheads are to be used, water and/or ethanol and/or other longer chain alcohols (e.g., pentanol) may be the solvent (i.e., makes up 35 wt % or more of the fusing agent) or co-solvents. For another example, if piezoelectric inkjet printheads are to be used, water may make up from about 25 wt % to about 30 wt % of the fusing agent, and the solvent (i.e., 35 wt % or more of the fusing agent) may be ethanol, isopropanol, acetone, etc. The co-solvent(s) of the fusing agent may also depend, in part, upon the build material composition that is being used with the fusing agent. For a hydrophobic powder (e.g., composite particles including a polyether block amide polymer including more polyamide blocks than polyether blocks, composite particles including a polyether block amide polymer where the polyamide blocks are larger than the polyether blocks, composite particles including a polyether block amide polymer where the polyether blocks are relatively hydrophobic, etc.), the FA vehicle may include a higher solvent content in order to improve the flow of the fusing agent into the build material composition.

The FA vehicle may also include humectant(s). In an example, the total amount of the humectant(s) present in the fusing agent ranges from about 3 wt % to about 10 wt %, based on the total weight of the fusing agent. An example of a suitable humectant is LIPONIC® EG-1 (i.e., LEG-1, glycereth-26, ethoxylated glycerol, available from Lipo Chemicals).

In some examples, the FA vehicle includes surfactant(s) to improve the jettability of the fusing agent. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Industries).

Whether a single surfactant is used or a combination of surfactants is used, the total amount of surfactant(s) in the fusing agent may range from about 0.01 wt % to about 10 wt % based on the total weight of the fusing agent. In an example, the total amount of surfactant(s) in the fusing agent may be about 3 wt % based on the total weight of the fusing agent.

An anti-kogation agent may be included in the fusing agent that is to be jetted using thermal inkjet printing. Kogation refers to the deposit of dried printing liquid (e.g., fusing agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent may range from greater than 0.20 wt % to about 0.65 wt % based on the total weight of the fusing agent. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent may include a total amount of antimicrobial agents that ranges from about 0.05 wt % to about 1 wt %. In an example, the antimicrobial agent(s) is/are a biocide(s) and is/are present in the fusing agent in an amount of about 0.25 wt % (based on the total weight of the fusing agent).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from greater than 0 wt % to about 2 wt % based on the total weight of the fusing agent. In an example, the chelating agent(s) is/are present in the fusing agent in an amount of about 0.04 wt % (based on the total weight of the fusing agent).

Coloring Agents

In the examples of the 3D printing kit, the 3D printing methods, and the 3D printing system disclosed herein, a coloring agent may be used. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), surfactant(s), anti-kogation agent(s), antimicrobial agent(s), and/or chelating agent(s) (each of which is described above in reference to the fusing agent).

The coloring agent may be a black ink, a cyan ink, a magenta ink, or a yellow ink. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum (e.g., the fusing agent absorbs 80% or more of radiation with wavelengths within the near-infrared spectrum). As such, the colorant in the coloring agent will not substantially absorb the fusing radiation, and thus will not initiate coalescing/fusing of the build material composition in contact therewith when the build material composition is exposed to the fusing radiation.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s).

Examples of black dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of

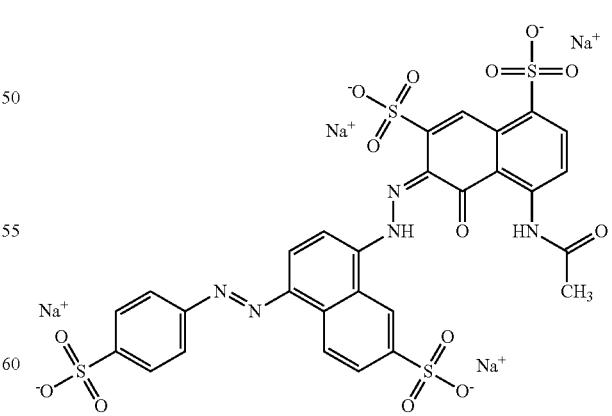

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical

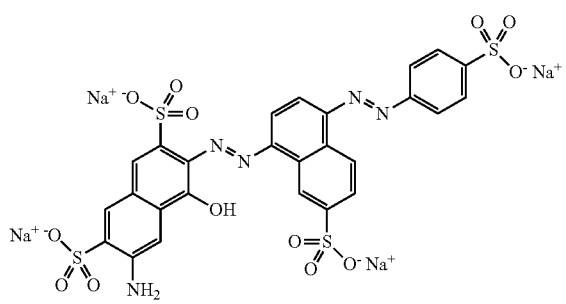

structure of: (commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

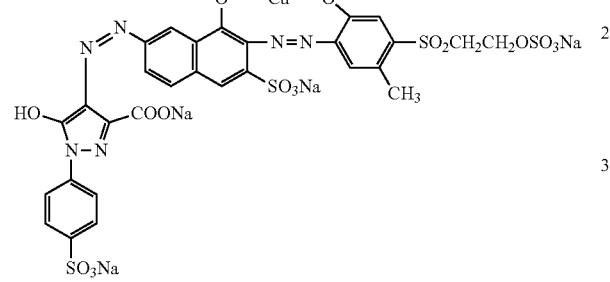

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

and combinations thereof. Some other commercially available examples of black dyes include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

Examples of cyan dyes include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

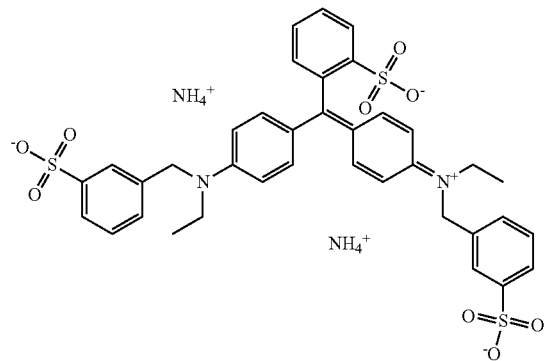

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

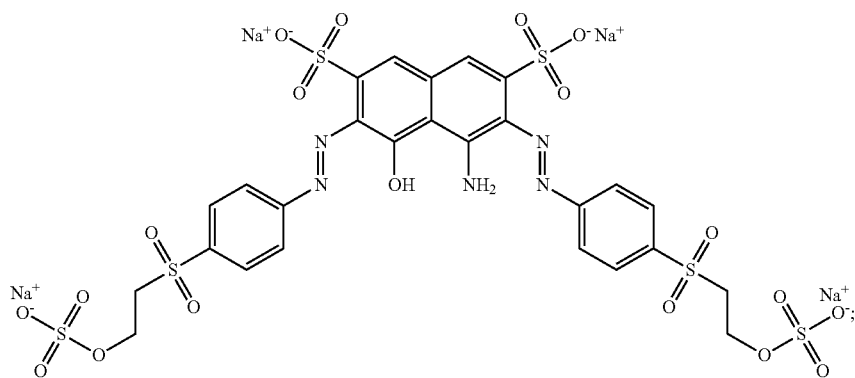

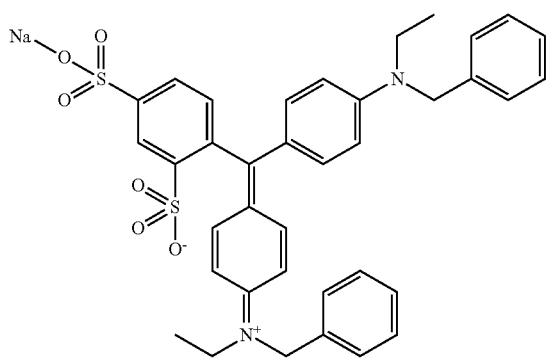

(commercially available as Acid Blue 7); and a phthalocyanine with a chemical structure of:

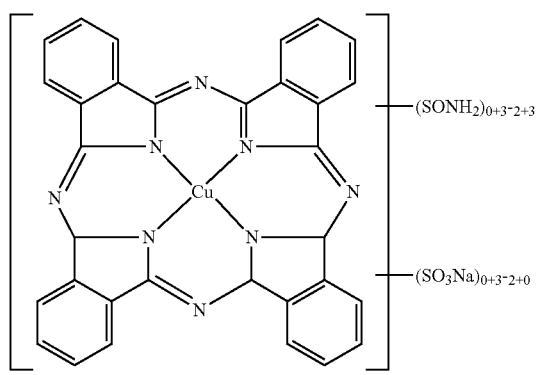

(commercially available as Direct Blue 199); and combinations thereof.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow inks, such as C1893A (cyan), C1984A (magenta), and C1985A (yellow); or C4801A (cyan), C4802A (magenta), and C4803A (yellow); all of which are available from HP Inc. Other commercially available coloring agents include C9384A (printhead HP 72), C9383A (printhead HP 72), C4901A (printhead HP 940), and C4900A (printhead HP 940).

Detailing Agents

In the examples of the 3D printing kit, the 3D printing methods, and the 3D printing system disclosed herein a detailing agent may be used. The detailing agent may include a surfactant, a co-solvent, and a balance of water. In some examples, the detailing agent consists of these components, and no other components. In some other examples, the detailing agent may further include additional components, such as anti-kogation agent(s), antimicrobial agent(s), and/or chelating agent(s) (each of which is described above in reference to the fusing agent).

The surfactant(s) that may be used in the detailing agent include any of the surfactants listed above in reference to the fusing agent. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent. The total amount of co-solvent(s) in the detailing agent may range from about 1.00 wt % to about 20.00 wt % with respect to the total weight of the detailing agent.

Similar to the fusing agent, the co-solvent(s) of the detailing agent may depend, in part upon the jetting technology that is to be used to dispense the detailing agent. For example, if thermal inkjet printheads are to be used, water and/or ethanol and/or other longer chain alcohols (e.g., pentanol) may make up 35 wt % or more of the detailing agent. For another example, if piezoelectric inkjet printheads are to be used, water may make up from about 25 wt % to about 30 wt % of the detailing agent, and 35 wt % or more of the detailing agent may be ethanol, isopropanol, acetone, etc.

The balance of the detailing agent is water. As such, the amount of water may vary depending upon the amounts of the other components that are included.

Printing Methods

Figure 2:
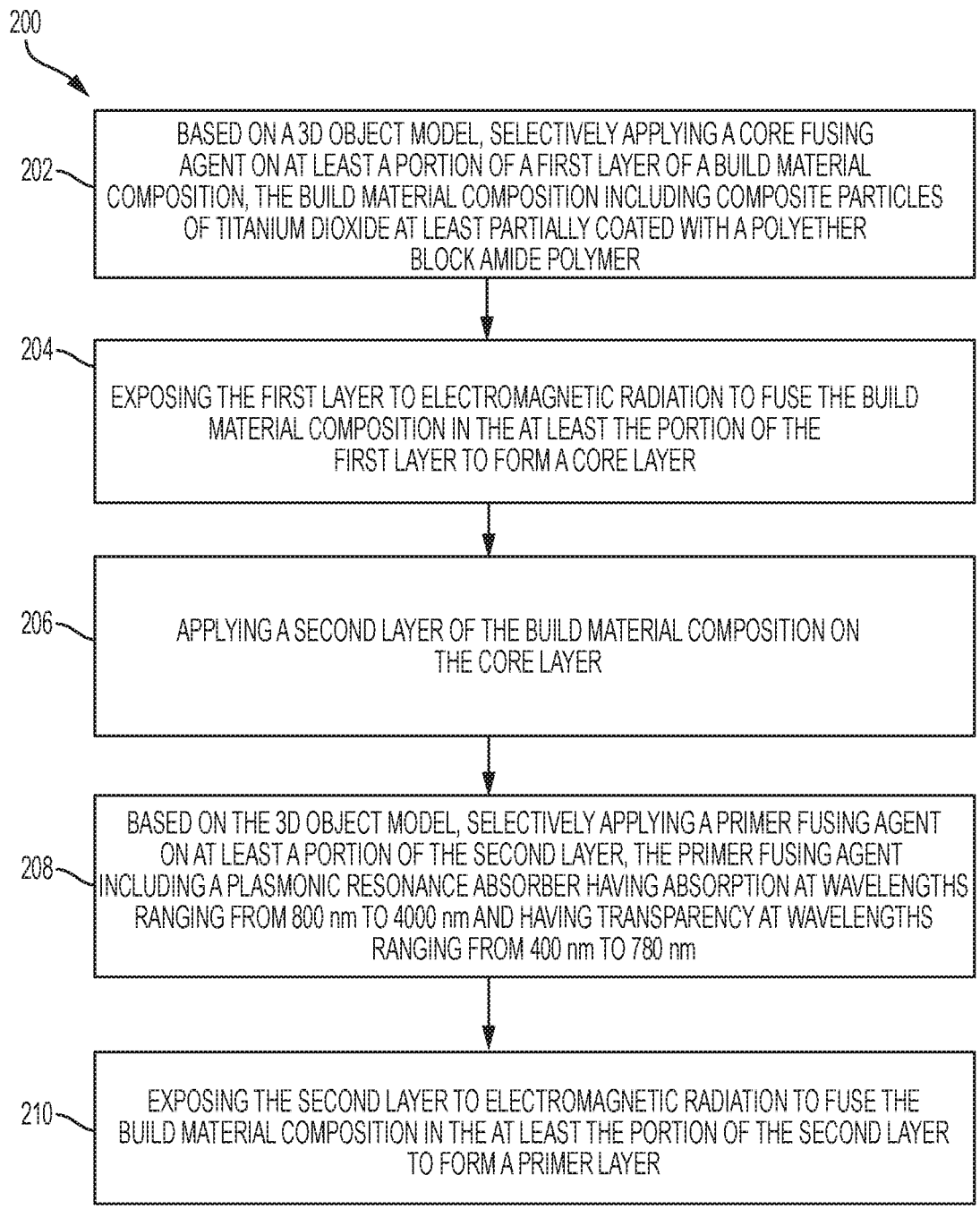
FIG. 2 is a flow diagram illustrating another example of a method for 3D printing.

Referring now to FIGS. 1 and 2, examples of methods 100, 200 for 3D printing are depicted. The examples of the methods 100, 200 may use examples of the 3D printing kit disclosed herein. Additionally, the examples of the methods 100, 200 may be used to print 3D objects that exhibit a white color, a cyan color, a magenta color, a yellow color, a black color, or a combination thereof.

As shown in FIG. 1, the method 100 for three-dimensional (3D) printing comprises: applying a build material composition to form a build material layer, the build material composition including composite particles of titanium dioxide at least partially coated with a polyether block amide polymer (reference numeral 102); based on a 3D object model, selectively applying a fusing agent on at least a portion of the build material layer (reference numeral 104); and exposing the build material layer to electromagnetic radiation to coalesce the at least the portion to form a layer of a 3D object (reference numeral 106).

In some examples, the method 100 further comprises: iteratively applying individual build material layers of the build material composition; based on the 3D object model, selectively applying the fusing agent to at least some of the individual build material layers to define individually patterned layers, wherein the fusing agent is selected from the group consisting of a core fusing agent, a primer fusing agent, or both the core fusing agent and the primer fusing agent; and iteratively exposing the individually patterned layers to the electromagnetic radiation to form individual object layers, wherein each of the individual object layers is selected from the group consisting of a core layer, a primer layer, or a layer including a core portion and a primer portion.

As shown in FIG. 2, the method 200 for three-dimensional (3D) printing comprises: based on a 3D object model, selectively applying a core fusing agent on at least a portion of a first layer of a build material composition, the build material composition including composite particles of titanium dioxide at least partially coated with a polyether block amide polymer (reference numeral 202); exposing the first layer to electromagnetic radiation to fuse the build material composition in the at least the portion of the first layer to form a core layer (reference numeral 204); applying a second layer of the build material composition on the core layer (reference numeral 206); based on the 3D object model, selectively applying a primer fusing agent on at least a portion of the second layer, the primer fusing agent including a plasmonic resonance absorber having absorption at wavelengths ranging from 800 nm to 4000 nm and having transparency at wavelengths ranging from 400 nm to 780 nm (reference numeral 208); and exposing the second layer to electromagnetic radiation to fuse the build material composition in the at least the portion of the second layer to form a primer layer (reference numeral 210).

In some examples, the method 200 further comprises: applying a third layer of the build material composition on the primer layer; based on the 3D object model, selectively applying a coloring agent and i) the core fusing agent or ii) the primer fusing agent on at least a portion of the third layer; and exposing the third layer to electromagnetic radiation to fuse the build material composition in the at least the portion of the third layer to form a colored layer having a colorant of the coloring agent embedded therein.

Figure 3:
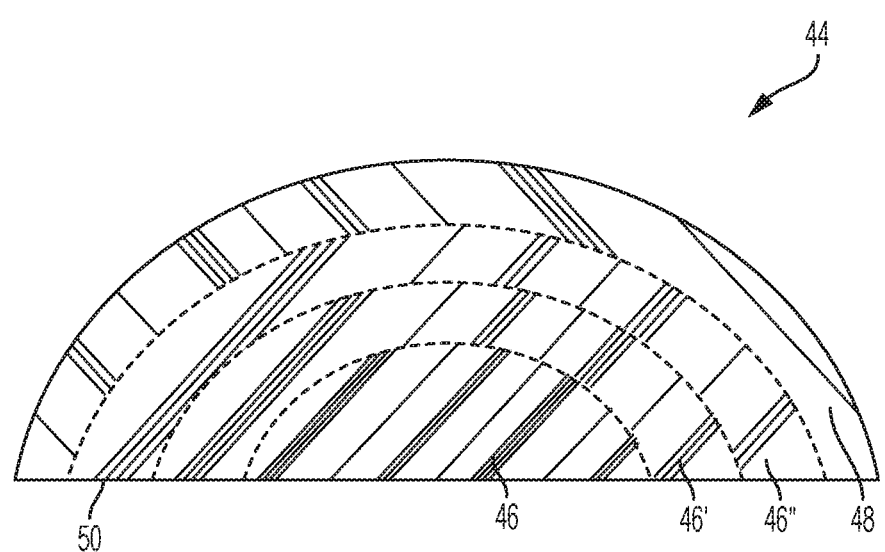
FIG. 3 is a cross-sectional view of an example of a part formed using an example of the 3D printing methods disclosed herein.

The methods 100, 200 may be used to form an object 44 as shown in FIG. 3, which includes several core layers 46, 46', 46" and an outer white layer 48 (also referred to herein as a primer layer). The core layers 46, 46', 46" are sequentially formed by selectively patterning respective build material layers with the core fusing agent 28 and exposing each patterned layer to electromagnetic radiation. The core layers 46, 46', 46" may be black or a dark color due to the absorber in the core fusing agent 28. The outer white layer 48 is formed by applying a build material layer on the outermost core layer 46", patterning it with the primer fusing agent 26, 26', and exposing it to electromagnetic radiation. Since the primer fusing agent 26, 26' has no or low tint, the white color of the embedded titanium dioxide is visible, and thus gives the outer white layer 48 its white appearance. The outer white layer 48 provides the object 44 with a white (or slightly tinted) exterior surface. As such, the outer white layer 48 optically isolates the black core layer(s) 46, 46', 46" that it covers.

In the example object 44 shown in FIG. 3, the outer white layer 48 does not completely surround the object 44, but rather may be formed on the outer surface(s) of the core layer 46" that will be visible. For example, in FIG. 3, the surface 50 of the object 44 may not be visible when the object 44 is in use, and thus it may not be desirable to form the outer white layer 48 on this surface 50.

It is to be understood that the methods 100, 200 may include additional processing to form the object 44 with an outer colored layer (not shown in FIG. 3) on at least a portion of the outer white layer 48, or to form another object 44' (shown in FIG. 4H) which has the core layer(s) 46 completely encapsulated by a primer layer (including primer layer portions 48', 48", 48'", which are referred to herein respectively as primer layers 48, 48', 48") and an outer colored layer (including colored layer portions 52, 52', 52", which are referred to herein as colored layers 52, 52', 52").

The method 300 to form the object 44' will now be discussed in reference to FIGS. 4A through 4H. It is to be understood that the method 300 may be an example of the method 100 and/or the method 200.

Prior to execution of any of the methods 100, 200, 300 disclosed herein or as part of the methods 100, 200, 300 a controller 36 (see, e.g., FIG. 7) may access data stored in a data store 34 (see, e.g., FIG. 7) pertaining to a 3D object 44' that is to be printed. For example, the controller 36 may determine the number of layers of the build material composition 16 that are to be formed, the locations at which the fusing agent(s) 26, 26', 28 from the applicator(s) 24A, 24B is/are to be deposited on each of the respective layers, etc.

In FIGS. 4A and 4B, a layer 54 of the build material composition 16 is applied on the build area platform 12. As mentioned above, the build material composition 16 includes at least the composite particles, and may additionally include the antioxidant, the antistatic agent, the flow aid, or combinations thereof.

In the example shown in FIGS. 4A and 4B, a printing system (e.g., the printing system 10 shown in FIG. 7) may be used to apply the build material composition 16. The printing system 10 may include a build area platform 12, a build material supply 14 containing the build material composition 16, and a build material distributor 18.

The build area platform 12 receives the build material composition 16 from the build material supply 14. The build area platform 12 may be moved in the directions as denoted by the arrow 20 (see FIG. 7), e.g., along the z-axis, so that the build material composition 16 may be delivered to the build area platform 12 or to a previously formed layer. In an example, when the build material composition 16 is to be delivered, the build area platform 12 may be programmed to advance (e.g., downward) enough so that the build material distributor 18 can push the build material composition 16 onto the build area platform 12 to form a substantially uniform layer of the build material composition 16 thereon. The build area platform 12 may also be returned to its original position, for example, when a new part is to be built.

The build material supply 14 may be a container, bed, or other surface that is to position the build material composition 16 between the build material distributor 18 and the build area platform 12. In some examples, the methods 100, 200, 300 further include heating the build material composition 16 in the build material supply 14 to a supply temperature ranging from about 60° C. to about 80° C. In these examples, the heating of the build material composition 16 in the build material supply 14 may be accomplished by heating the build material supply 14 to the supply temperature.

The build material distributor 18 may be moved in the directions as denoted by the arrow 22 (see FIG. 7), e.g., along the y-axis, over the build material supply 14 and across the build area platform 12 to spread the layer 54 of the build material composition 16 over the build area platform 12. The build material distributor 18 may also be returned to a position adjacent to the build material supply 14 following the spreading of the build material composition 16. The build material distributor 18 may be a blade (e.g., a doctor blade), a roller, a combination of a roller and a blade, and/or any other device capable of spreading the build material composition 16 over the build area platform 12. For instance, the build material distributor 18 may be a counter-rotating roller. In some examples, the build material supply 14 or a portion of the build material supply 14 may translate along with the build material distributor 18 such that build material composition 16 is delivered continuously to the material distributor 18 rather than being supplied from a single location at the side of the printing system 10 as depicted in FIG. 4A.

In FIG. 4A, the build material supply 14 may supply the build material composition 16 into a position so that it is ready to be spread onto the build area platform 12. The build material distributor 18 may spread the supplied build material composition 16 onto the build area platform 12. The controller 34 may process "control build material supply" data, and in response, control the build material supply 14 to appropriately position the particles of the build material composition 16, and may process "control spreader" data, and in response, control the build material distributor 18 to spread the supplied build material composition 16 over the build area platform 12 to form the layer 54 of build material composition 16 thereon. As shown in FIG. 4B, one build material layer 54 has been formed.

The layer 54 of the build material composition 16 has a substantially uniform thickness across the build area platform 12. In an example, the build material layer 54 has a thickness ranging from about 70 μm to about 100 μm. In another example, the thickness of the build material layer 54 is about 80 μm. It is to be understood that thinner or thicker layers may also be used. For example, the thickness of the build material layer 54 may range from about 20 μm to about 500 μm. The layer thickness may be about 2× (i.e., 2 times) the average diameter of the composite particles at a minimum for finer part definition. In some examples, the layer thickness may be about 1.2× the average diameter of the composite particles.

To form the object 44 shown in FIG. 3, this layer 54 of build material composition 16 would be patterned with the core fusing agent 28 (i.e., the core fusing agent 28 would be selectively dispensed on the layer 54 according to a pattern of a cross-section for the core layer 46), and then exposed to electromagnetic radiation to form the core layer 46. As used herein, the cross-section of the layer of the part to be formed refers to the cross-section that is parallel to the contact surface of the build area platform 12. As an example, if the core layer 46 is to be shaped like a cube or cylinder, the core fusing agent 28 will be deposited in a square pattern or a circular pattern (from a top view), respectively, on at least a portion of the layer 54 of the build material composition 16.

In the example shown in FIG. 4B, the layer 54 of build material composition 16 is a sacrificial layer that is used to enhance the color of the first layer (e.g., colored layer 52) of the object 44' that is being formed. As shown in FIG. 4B, the coloring agent 30 is selectively applied to at least the portion 56 of the layer 54. As such, the particles of the build material composition 16 in this portion 56 of the layer 54 become colored. In this example, this sacrificial layer 54 is not coalesced/fused (as no primer fusing agent 26, 26' or core fusing agent 28 is applied thereon). Rather, some of the colored particle of the build material composition 16 in the sacrificial layer 54 may become embedded in coalesced/fused build material composition of the part layer (e.g., colored layer 52) that is formed thereon. In other words, some of the colored build material composition 16 in portion 56 may become embedded in the surface of the part layer that is formed adjacent thereto. The non-coalesced/non-fused, but embedded colored build material composition 16 may help to maintain saturation at the surface (of the ultimately formed colored layer 52) by providing a colored interface between the colored layer 52 and surrounding non-coalesced/non-fused build material composition 16.

It is to be understood that the selective application of the coloring agent 30 may be accomplished in a single printing pass or in multiple printing passes. In an example, selectively applying of the coloring agent 30 is accomplished in multiple printing passes. In another example, the selectively applying of the coloring agent 30 is accomplished in a number of printing passes ranging from 2 to 4. It may be desirable to apply the coloring agent 30 in multiple printing passes to increase the amount of the colorant that is applied to the build material composition 16, to avoid liquid splashing, to avoid displacement of the build material composition 16, etc.

It is also to be understood that when an agent (e.g., the primer fusing agent 26, 26', the core fusing agent 28, the coloring agent 30, the detailing agent 42, etc.) is to be selectively applied to the build material composition 16, the agent 26, 26', 28, 30, 42 may be dispensed from an applicator 24A, 24B, 24C. The applicator(s) 24A, 24B, 24C may each be a thermal inkjet printhead, a piezoelectric printhead, a continuous inkjet printhead, etc., and the selective application of the agent(s) 26, 26', 28, 30, 42 may be accomplished by thermal inkjet printing, piezo electric inkjet printing, continuous inkjet printing, etc. The controller 36 may process data, and in response, control the applicator(s) 24A, 24B, 24C (e.g., in the directions indicated by the arrow 32, see FIG. 7) to deposit the agent(s) 26, 26', 28, 30, 42 onto predetermined portion(s) of the build material composition 16. Throughout the method 300, a single applicator may be labeled with multiple reference numbers (24A, 24B and/or 24C), although it is to be understood that the applicators may be separate applicators or a single applicator with several individual cartridges for dispensing the respective agents 26, 26', 28, 30, 42.

While not shown in FIG. 4B, the detailing agent 42 may be selectively applied on the portion 56 with the coloring agent 30. The detailing agent 42 may be used to maintain the temperature of the build material composition 16 in contact therewith below the lowest temperature in the melting range of the polyether block amide polymer included in the composite particles. Since the sacrificial layer 54 is not to be coalesced/fused, the detailing agent 42 may be applied to this layer 54 with the coloring agent 30.

Additionally, while a sacrificial layer 54 is shown, it is to be understood that several sacrificial layers 54 may be sequentially formed in contact with one another.

The color of the coloring agent 30 that is applied to the portion(s) 56 of the sacrificial layer 54 will depend upon the desired color for the object 44' or at least the portion of the colored layer 52 formed adjacent thereto. As examples, black ink, cyan ink, magenta ink, and yellow ink may be applied alone or in combination to achieve a variety of colors.

The coloring agent 30 will penetrate at least partially into the sacrificial layer 54. Depending upon the particle size of the colorant in the coloring agent 30 and size of the voids between the particles of the build material composition 16, the coloring agent 30 may penetrate throughout the entire thickness of the sacrificial layer 54. This creates a surface upon which a subsequent layer 58 of build material composition 16 may be applied.

The layer 58 of the build material composition 16 may be applied in the same manner as the layer 54. The layer 58 is shown in FIG. 4C. The layer 58 may be considered to be the first build material layer because at least a portion of this layer 58 will be coalesced/fused to form the first layer of the 3D object 44' (since the sacrificial layer 54 is not coalesced/fused).

After the build material composition 16 has been applied, and prior to further processing, the build material layer 58 may be exposed to heating. Heating may be performed to pre-heat the build material composition 16, and thus the heating temperature may be below the melting range of the polyether block amide polymer included in the composite particles. As such, the temperature selected will depend upon the build material composition 16 that is used. As examples, the pre-heating temperature may be from about 5°

C. to about 50° C. below the lowest temperature in the melting range of the polyether block amide polymer. In an example, the pre-heating temperature ranges from about 50° C. to about 130° C. In another example, the pre-heating temperature ranges from about 100° C. to about 130° C. In still another example, the methods 100, 200, 300 further comprise, prior to the selectively applying of the fusing agent 26, 26', 28, pre-heating the build material composition 16 to a pre-heating temperature ranging from about 110° C. to about 125° C. The low pre-heating temperature may enable the non-patterned build material composition 16 to be easily removed from the 3D object 44' after completion of the 3D object 44'.

Pre-heating the layer 58 of the build material composition 16 may be accomplished by using any suitable heat source that exposes all of the build material composition 16 on in the layer 58 to the heat. Examples of the heat source include a thermal heat source (e.g., a heater (not shown) integrated into the build area platform 12 (which may include sidewalls)) or the radiation source 38, 38' (see, e.g., FIG. 7).

After the layer 58 is formed, and in some instances is pre-heated, the primer fusing agent 26, 26' and the coloring agent 30 are selectively applied on the same portion(s) 60 of the build material composition 16 in the layer 58.

As mentioned above, the primer fusing agent 26, 26' includes an aqueous or non-aqueous vehicle and a plasmonic resonance absorber dispersed therein. The fusing agent 26' is one specific example of the low tint or primer fusing agent, which includes CTO nanoparticles as the plasmonic resonance absorber, a zwitterionic stabilizer, and an aqueous vehicle. Example compositions of the primer fusing agent 26, 26' are described above.

When the desired color for the object 44' or a particular colored layer 52 of the object 44' is the color of the coloring agent 30, the primer fusing agent 26, 26' is applied with the coloring agent 30. Since the primer fusing agent 26, 26' is clear or slightly tinted, the color of the coloring agent 30 will be the color of the resulting colored layer 52, as the colorants of the coloring agent 30 become embedded throughout the coalesced/fused build material composition of the colored layer 52. The primer fusing agent 26, 26' may be particularly suitable for obtaining lighter colors or white.

The primer fusing agent 26, 26' and the coloring agent 30 are selectively applied in a pattern of a cross-section for the colored layer 52 that is to be formed (shown in FIG. 4D). In the example shown in FIG. 4C, the portion 60 is adjacent to the portion 56 of the layer 54 to which the coloring agent 30 has been applied.

It is to be understood that the selective application of the primer fusing agent 26, 26' may be accomplished in a single printing pass or in multiple printing passes. In an example, selectively applying of the primer fusing agent 26, 26' is accomplished in multiple printing passes. In another example, the selectively applying of the primer fusing agent 26, 26' is accomplished in a number of printing passes ranging from 2 to 4. In still another example, selectively applying of the primer fusing agent 26, 26' is accomplished in 2 printing passes. In yet another example, selectively applying of the primer fusing agent 26, 26' is accomplished in 4 printing passes. It may be desirable to apply the primer fusing agent 26, 26' in multiple printing passes to increase the amount of the energy absorber that is applied to the build material composition 16, to avoid liquid splashing, to avoid displacement of the build material composition 16, etc.

The volume of the primer fusing agent 26, 26' that is applied per unit of the build material composition 16 in the patterned portion 60 may be sufficient to absorb and convert enough electromagnetic radiation so that the build material composition 16 in the patterned portion 60 will coalesce/fuse. The volume of the primer fusing agent 26, 26' that is applied per unit of the build material composition 16 may depend, at least in part, on the energy absorber used, the energy absorber loading in the primer fusing agent 26, 26', and the build material composition 16 used.

After the primer fusing agent 26, 26' and the coloring agent 30 are selectively applied in the specific portion(s) 60 of the layer 58, the entire layer 58 of the build material composition 16 is exposed to electromagnetic radiation (shown as EMR Exposure between FIGS. 4C and 4D).

The electromagnetic radiation is emitted from the radiation source 38, 38'. The length of time the electromagnetic radiation is applied for, or energy exposure time, may be dependent, for example, on one or more of: characteristics of the radiation source 38, 38'; characteristics of the build material composition 16; and/or characteristics of the primer fusing agent 26, 26'.

It is to be understood that the exposing of the build material composition 16 to electromagnetic radiation may be accomplished in a single radiation event or in multiple radiation events. In an example, the exposing of the build material composition 16 is accomplished in multiple radiation events. In another example, the exposing of the build material composition 16 to electromagnetic radiation may be accomplished in a number of radiation events ranging from 3 to 8. In still another example, the exposing of the build material composition 16 to electromagnetic radiation may be accomplished in 3 radiation events. It may be desirable to expose the build material composition 16 to electromagnetic radiation in multiple radiation events to counteract a cooling effect that may be brought on by the amount of the primer fusing agent 26, 26' that is applied to the build material layer 58. Additionally, it may be desirable to expose the build material composition 16 to electromagnetic radiation in multiple radiation events to sufficiently elevate the temperature of the build material composition 16 in the portion(s) 60, without over heating the build material composition 16 in the non-patterned portion(s).

The primer fusing agent 26, 26' enhances the absorption of the radiation, converts the absorbed radiation to thermal energy, and promotes the transfer of the thermal heat to the build material composition 16 in contact therewith. In an example, the primer fusing agent 26, 26' sufficiently elevates the temperature of the build material composition 16 in the layer 58 to a temperature within or above the melting range of the polyether block amide polymer included in the composite particles, allowing coalescing/fusing (e.g., thermal merging, melting, binding, etc.) of the build material composition 16 to take place. The application of the electromagnetic radiation forms the colored layer 52, shown in FIG. 4D.

In some examples of the methods 100, 200, 300, the electromagnetic radiation has a wavelength ranging from 800 nm to 4000 nm. In another example the electromagnetic radiation has a wavelength ranging from 800 nm to 1400 nm. In still another example, the electromagnetic radiation has a wavelength ranging from 800 nm to 1200 nm. Radiation having wavelengths within the provided ranges may be absorbed (e.g., 80% or more of the applied radiation is absorbed) by the primer fusing agent 26, 26' and may heat the build material composition 16 in contact therewith, and may not be substantially absorbed (e.g., 25% or less of the applied radiation is absorbed) by the non-patterned build material composition 16.

It is to be understood that portions of the build material composition 16 that do not have the primer fusing agent 26, 26' applied thereto do not absorb enough radiation to coalesce/fuse. As such, these portions do not become part of the 3D object 44' that is ultimately formed. However, the generated thermal energy may propagate into the surrounding build material composition 16 that does not have primer fusing agent 26, 26' applied thereto. The propagation of thermal energy may be inhibited from coalescing/fusing the non-patterned build material composition 16 in the layer 58, for example, when the detailing agent 42 is applied to the build material composition 16 in the layer 58 that are not exposed to the primer fusing agent 26, 26'. Moreover, the propagation of thermal energy may be inhibited from coalescing/fusing the build material composition 16 in the layer 54 when the detailing agent 42 is applied with the coloring agent 30 in the layer 54. However, as mentioned above, some of the colored build material composition 16 in the layer 54 may become embedded in the adjacent surface of the coalesced/fused build material composition of the colored layer 52.

While a single colored layer 52 is shown, it is to be understood that several colored layers 52 may be sequentially formed in contact with one another so that a color region (thicker than one voxel) is built up around the core layer(s) 46 in the final object 44'. The outermost colored layer 52 may form a one voxel deep shell, and the other colored layers may create the thicker color region. The levels of the primer fusing agent 26, 26' and the coloring agent 30 may be higher in the outermost colored layer 52, compared to other colored layers positioned closer to the core layer(s) 46, in order to increase color saturation at the exterior of the formed object 44'.

FIG. 4D also illustrates yet another layer 62 of the build material composition 16, this time the layer 62 being applied to the colored layer 52 and to any non-coalesced/non-fused build material composition 16 of layer 58. The layer 62 may be applied in the same manner as the layers 54, 58.

Prior to further processing, the layer 62 of the build material composition 16 may be exposed to pre-heating in the manner previously described.

After the layer 62 is formed, and in some instances is pre-heated, the primer fusing agent 26, 26' is selectively applied on portion(s) 64 of the build material composition 16 in the layer 62. The portion(s) 64 of the layer 62 will form the primer layer 48', which is white, clear, or slightly tinted from the primer fusing agent 26, 26'. This primer layer 48' is positioned between the colored layer 52 and subsequently formed black core layer(s) 46 in the object 44' (see FIG. 4H). This primer layer 48' may be referred to as the initial layer or the first primer layer. The primer layer 48' optically isolates at least a portion of the black core layer(s) 46.

Figure 4E:
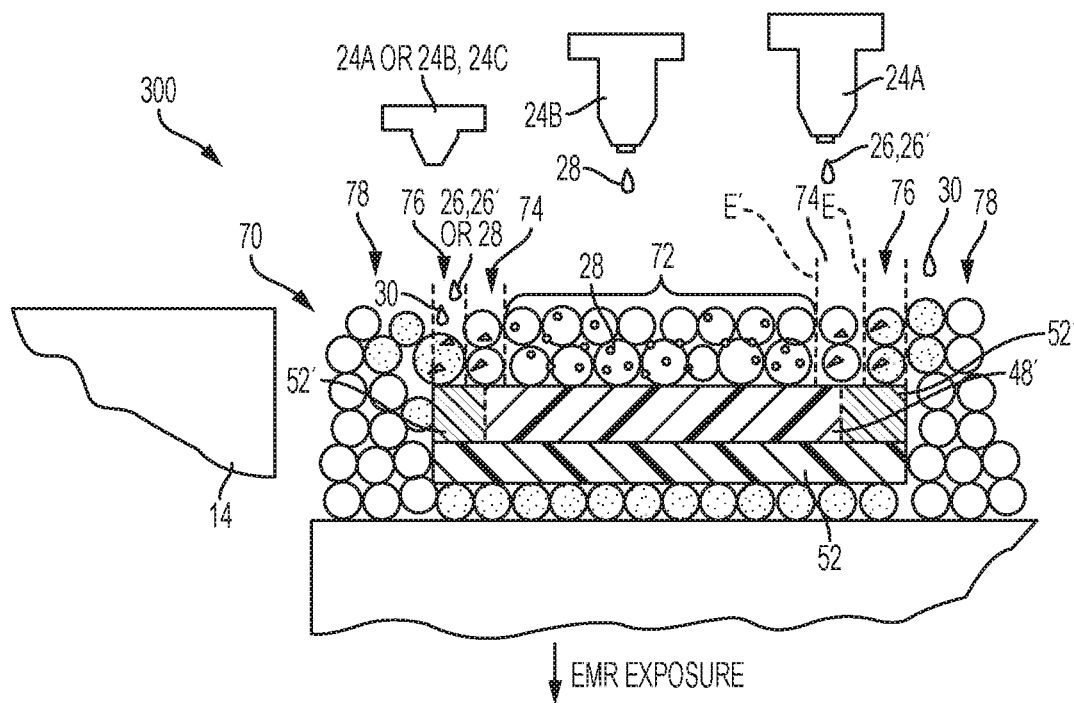

In the example shown in FIG. 4D, the portion 64 to which the primer fusing agent 26, 26' is selectively applied is adjacent to part (but not all) of the already formed colored layer 52. Selectively applying the primer fusing agent 26, 26' in this manner may be performed when it is desirable to form colored layer(s) 52' (shown in FIG. 4E) along the sides of the object 44' that is being formed. To form the colored layer(s) 52' along the sides of the object 44', the primer fusing agent 26, 26' and the coloring agent 30 are selectively applied on other portion(s) 66 of the build material composition 16 in the layer 62. As an example, the portion(s) 66 may define the perimeter of that particular layer of the object 44' that is being formed, and may be outside of a perimeter or an edge boundary E (i.e., the outermost portions where the primer fusing agent 26, 26' alone is selectively deposited in any build material layer) of the portion 64.

When it is desirable to form the colored layer 52' (shown in FIG. 4E) along the sides of the object 44' that is being formed, it may also be desirable to selectively deposit the coloring agent 30 (with or without the detailing agent 42) in portion(s) 68 of the non-patterned build material composition 16 which are adjacent to or surround the portion(s) 66 (which when coalesced/fused, will form the colored layer 52' along the sides of the object 44'). The colored build material composition 16 in the portion(s) 68 may become embedded in coalesced/fused build material composition of the colored layer 52'. This non-coalesced/non-fused, but embedded colored build material composition 16 may help to maintain saturation at the surface (of the colored layer 52') by providing a colored interface between the colored layer 52' and surrounding non-coalesced/non-fused build material composition 16.

After the primer fusing agent 26, 26' is applied on the portion(s) 64, and in some instances the primer fusing agent 26, 26' and the coloring agent 30 are selectively applied on the portion(s) 66, the entire layer 62 of the build material composition 16 is exposed to electromagnetic radiation (shown as EMR Exposure between FIGS. 4D and 4E) in the manner previously described. Exposure to electromagnetic radiation forms the primer layer 48', as shown in FIG. 4E.

If the primer fusing agent 26, 26' and the coloring agent 30 are selectively applied on the portion(s) 66, the EMR exposure will form colored layer(s) 52' at the outer edge(s). This exposure to electromagnetic radiation forms the colored layer(s) 52', as shown in FIG. 4E.

The width of the colored layer(s) 52' may be large enough to form the color region at this portion of the object 44'. The levels of the primer fusing agent 26, 26', and the coloring agent 30 may be higher at the outermost edge of the colored layer(s) 52', compared to the innermost edge(s) of the colored layer(s) 52', in order to increase color saturation at the exterior of the formed object 44'.

FIG. 4E also illustrates yet another layer 70 of the build material composition 16, this time the layer 70 being applied to the primer layer 48', the colored layer(s) 52', and to any non-coalesced/non-fused build material composition 16 of layer 62. The layer 70 may be applied in the same manner as the layers 54, 58, 62.

Prior to further processing, the layer 70 of the build material composition 16 may be exposed to pre-heating in the manner previously described.

After the layer 70 is formed, and in some instances is pre-heated, the core fusing agent 28 is selectively applied on portion(s) 72 of the build material composition 16 in the layer 70. In one example, the method 200 includes: based on a 3D object model, selectively applying a core fusing agent 28 on at least a portion 72 of a (first) layer 70 of a build material composition 16, the build material composition 16 including composite particles of titanium dioxide at least partially coated with a polyether block amide polymer.

As mentioned above, the core fusing agent 28 includes at least an aqueous or non-aqueous vehicle and an active material dispersed or dissolved therein.

It is to be understood that the selective application of the core fusing agent 28 may be accomplished in a single printing pass or in multiple printing passes. In an example, selectively applying of the core fusing agent 28 is accomplished in multiple printing passes. In another example, the selectively applying of the core fusing agent 28 is accomplished in a number of printing passes ranging from 2 to 4. In still another example, selectively applying of the core fusing agent 28 is accomplished in 2 printing passes. In yet another example, selectively applying of the core fusing agent 28 is accomplished in 4 printing passes. It may be desirable to apply the core fusing agent 28 in multiple printing passes to increase the amount of the energy absorber that is applied to the build material composition 16, to avoid liquid splashing, to avoid displacement of the build material composition 16, etc.

The volume of the core fusing agent 28 that is applied per unit of the build material composition 16 in the patterned portion 72 may be sufficient to absorb and convert enough electromagnetic radiation so that the build material composition 16 in the patterned portion 72 will coalesce/fuse. The volume of the core fusing agent 28 that is applied per unit of the build material composition 16 may depend, at least in part, on the energy absorber used, the energy absorber loading in the core fusing agent 28, and the build material composition 16 used.

The portion(s) 72 of the layer 70 will form the core layer 46 (FIG. 4F), which may be black from the core fusing agent 28. While a single core layer 46 is shown, it is to be understood that several core layers 46 may be sequentially formed in contact with one another so that a core region (or part core) is built up, which makes up the bulk of the object 44'. Several core layers 46 may enhance the mechanical properties of the object 44'.

In the example shown in FIG. 4E, the portion 72 to which the core fusing agent 28 is selectively applied is adjacent to part (but not all) of the already formed primer layer 48'. Selectively applying the core fusing agent 28 in this manner may be performed when it is desirable to form colored layer(s) 52' (shown in FIG. 4F) along the sides of the object 44' that is being formed. Since the core layer 46 being formed may be black, it may also be desirable to form the primer layer 48" between the core layer 46 and the adjacent colored layer(s) 52'.

To form the primer layer 48" along the perimeter of the core layer 46, the primer fusing agent 26, 26' is selectively applied on other (or second) portion(s) 74 of the build material composition 16 in the layer 70 that are immediately adjacent to the perimeter or edge boundary E' (i.e., the outermost portions where the core fusing agent 28 alone is selectively deposited in any build material layer) of the portion 72. The perimeter/edge boundary E' is thus defined by the core fusing agent 28. To form the colored layer(s) 52' along/adjacent to the perimeter of the primer layer 48", the primer fusing agent 26, 26' and the coloring agent 30 are selectively applied on still other (or third) portion(s) 76 of the build material composition 16 in the layer 70 that are immediately adjacent to the perimeter or edge boundary E of the portion 74 (which is defined by the primer fusing agent 26, 26').

When it is desirable to form the colored layer(s) 52' (shown in FIG. 4F) along the sides of the object 44' that is being formed, it may also be desirable to selectively deposit the coloring agent 30 (with or without the detailing agent 42) in portion(s) 78 of the non-patterned build material composition 16 which are adjacent to or surround the portion(s) 76 (which when coalesced/fused, will form the colored layer 52' along the sides of the object 44').

After the layer 70 is patterned in a desirable manner with at least the core fusing agent 28, the entire layer 70 of the build material composition 16 is exposed to electromagnetic radiation (shown as EMR Exposure between FIGS. 4E and 4F) in the manner previously described, except that the wavelength range may be expanded to as low as 400 nm because some of the energy absorbers in the core fusing agent 28 can absorb visible light as well as infrared light. In one example, the method 200 includes: exposing the (first) layer 70 to electromagnetic radiation to fuse the build material composition 16 in the at least the portion 72 of the (first) layer 70 to form a core layer 46.

The core fusing agent 28 enhances the absorption of the radiation in portion 72, converts the absorbed radiation to thermal energy, and promotes the transfer of the thermal heat to the build material composition 16 in contact therewith. In an example, the core fusing agent 28 sufficiently elevates the temperature of the build material composition 16 in portion 72 to a temperature within or above the melting range of the polyether block amide polymer included in the composite particles, allowing coalescing/fusing (e.g., thermal merging, melting, binding, etc.) of the build material composition 16 to take place. Exposure to electromagnetic radiation forms the core layer 46, as shown in FIG. 4F.

Figure 4F:
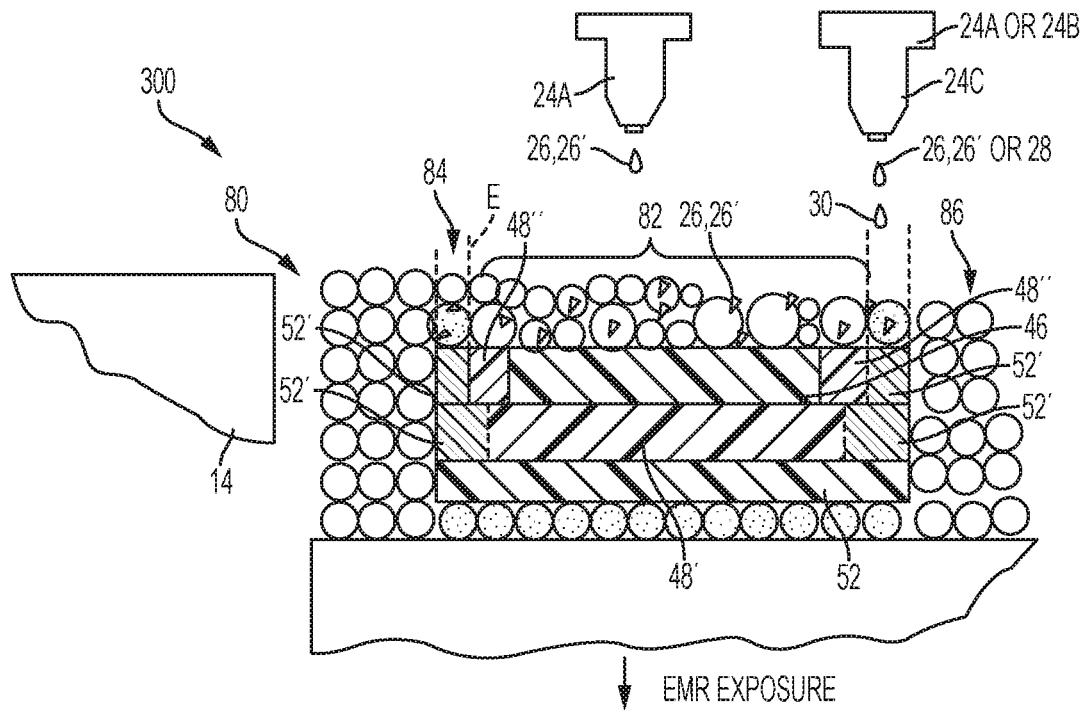

If the primer fusing agent 26, 26' is selectively applied on the portion(s) 74, and the primer fusing agent 26, 26' and the coloring agent 30 are selectively applied on the portion(s) 76, the EMR exposure will also form primer layer(s) 48" and colored layer(s) 52' at the outer edge(s) of the core layer 46, as shown in FIG. 4F.

The width of the primer layer(s) 48" may be large enough to optically isolate the black core layer 46.

FIG. 4F also illustrates yet another layer 80 of the build material composition 16, this time the layer 80 being applied to the core layer 46, the primer layer(s) 48", the colored layer(s) 52', and to any non-coalesced/non-fused build material composition 16 of layer 70. The layer 80 may be applied in the same manner as the layers 54, 58, 62, 70. In one example, the method 200 includes: applying a second layer 80 of the build material composition 16 on the core layer 46.

Prior to further processing, the layer 80 of the build material composition 16 may be exposed to pre-heating in the manner previously described.

After the layer 80 is formed, and in some instances is pre-heated, the primer fusing agent 26, 26' is selectively applied on portion(s) 82 of the build material composition 16 in the layer 80. In one example, the method 200 includes: based on the 3D object model, selectively applying a primer fusing agent 26, 26' on at least a portion 82 of the second layer 80, the primer fusing agent 26, 26' including a plasmonic resonance absorber having absorption at wavelengths ranging from 800 nm to 4000 nm and having transparency at wavelengths ranging from 400 nm to 780 nm.

The portion(s) 82 of the layer 80 will form another primer layer 48''', which is white or slightly tinted from the primer fusing agent 26, 26'. This primer layer 48''' is positioned between the black core layer(s) 46 and subsequently formed colored layer(s) 52" in the object 44' (see FIG. 4H). As such, the primer layer 48''' optically isolates the black core layer(s) 46 at another end of the formed object 44'.

In the example shown in FIG. 4F, the portion 82 to which the primer fusing agent 26, 26' is selectively applied is adjacent to the already formed core layer(s) 46 and primer layer(s) 48". Selectively applying the primer fusing agent 26, 26' in this manner may be performed when it is desirable to form colored layer(s) 52' (shown in FIG. 4G) along the sides of the object 44' that is being formed. To form the colored layer(s) 52' along the sides of the object 44', the primer fusing agent 26, 26' and the coloring agent 30 are selectively applied on portion(s) 84 of the build material composition 16 in the layer 82. As an example, the portion(s) 84 may define the perimeter of that particular layer of the object 44' that is being formed, and may be outside of an edge boundary E of the portion 82.

When it is desirable to form the colored layer 52' (shown in FIG. 4G) along the sides of the object 44' that is being formed, it may also be desirable to selectively deposit the coloring agent 30 (with or without the detailing agent 42) in portion(s) 86 of the non-patterned build material composition 16 which are adjacent to or surround the portion(s) 84 (which when coalesced/fused, will form the colored layer 52' along the sides of the object 44').

Figure 4G:
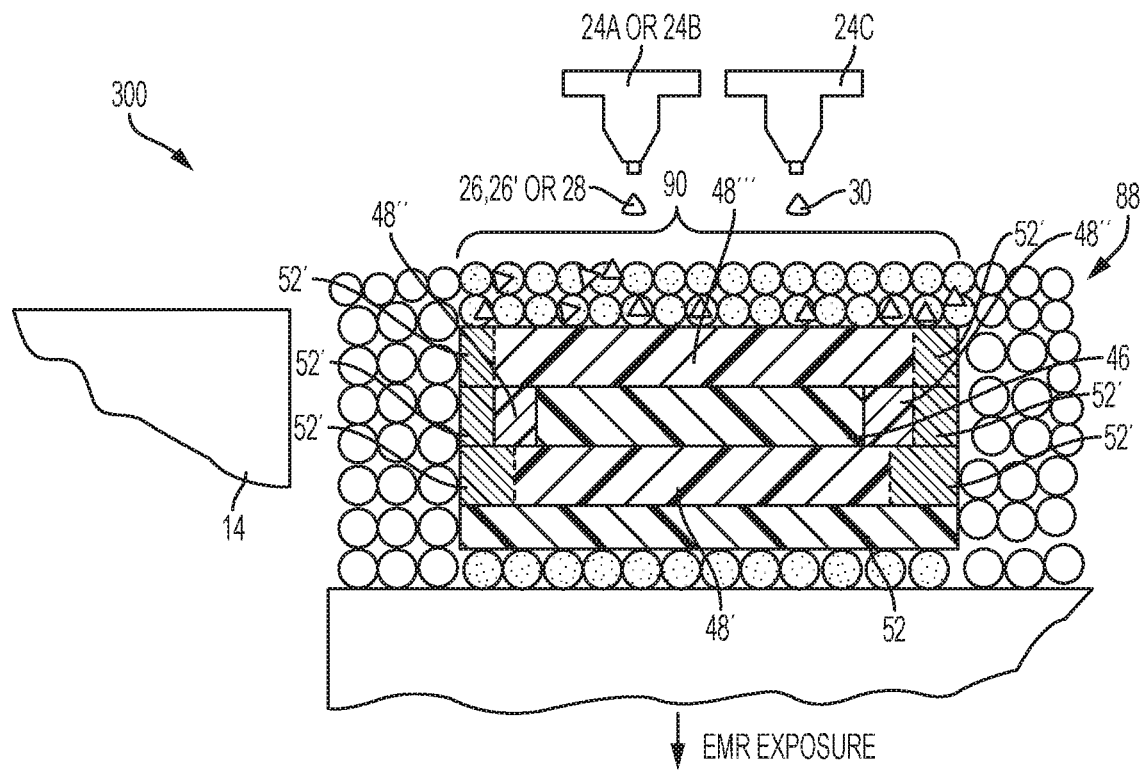

After the primer fusing agent 26, 26' is applied on the portion(s) 82, and in some instances the primer fusing agent 26, 26' and the coloring agent 30, are selectively applied on the portion(s) 84, the entire layer 80 of the build material composition 16 is exposed to electromagnetic radiation (shown as EMR Exposure between FIGS. 4F and 4G) in the manner previously described. Exposure to electromagnetic radiation forms the primer layer 48''', as shown in FIG. 4G. In one example, the method 200 includes: exposing the second layer 80 to electromagnetic radiation to fuse the build material composition 16 in the at least the portion 82 of the second layer 80 to form a primer layer 48'''.

If the primer fusing agent 26, 26' and the coloring agent 30 are selectively applied on the portion(s) 84, the EMR exposure will form colored layer(s) 52' at the outer edge(s) of the primer layer 48'''. This exposure to electromagnetic radiation forms the colored layer(s) 52', as shown in FIG. 4G.

FIG. 4G also illustrates yet another layer 88 of the build material composition 16, this time the layer 88 being applied to the primer layer(s) 48''' and the colored layer(s) 52' adjacent thereto, and to any non-coalesced/non-fused build material composition 16 of layer 80. The layer 88 may be applied in the same manner as the layers 54, 58, 62, 70, 80. In one example, the method 200 includes: applying a third layer 88 of the build material composition 16 on the primer layer 48'''.

Prior to further processing, the layer 88 of the build material composition 16 may be exposed to pre-heating in the manner previously described.

After the layer 88 is formed, and in some instances is pre-heated, the primer fusing agent 26, 26' and the coloring agent 30 are selectively applied on the same portion(s) 90 of the build material composition 16 in the layer 88. In one example, the method 200 includes: based on the 3D object model, selectively applying a coloring agent 30 and i) the core fusing agent 28 or ii) the primer fusing agent 26, 26' on at least a portion 90 of the third layer 88.

Figure 4H:
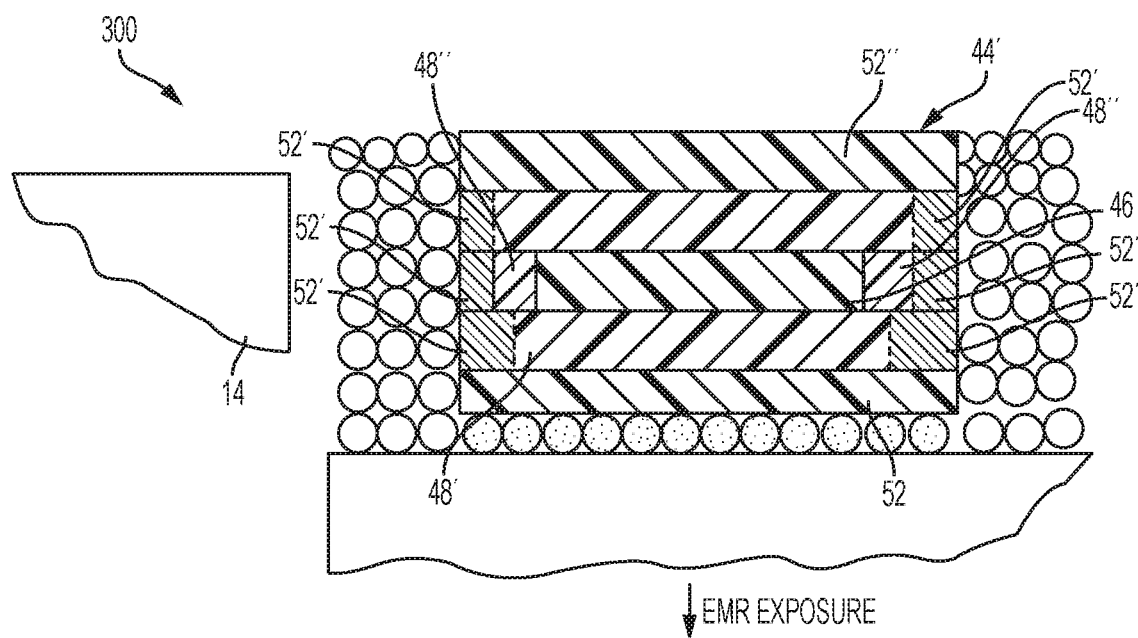

The primer fusing agent 26, 26' and the coloring agent 30 are selectively applied in a pattern of a cross-section for the colored layer 52" that is to be formed (shown in FIG. 4H). In the example shown in FIG. 4G, the portion 90 is adjacent to the primer layer 48''' and the colored layer(s) 52' is adjacent to the primer layer 48'''.

When the desired color for the object 44' or a particular colored layer 52" of the object 44' is the color of the coloring agent 30, the primer fusing agent 26, 26' is applied with the coloring agent 30. Since the primer fusing agent 26, 26' is clear or slightly tinted and the build material composition 16 is white, the color of the coloring agent 30 will be the color of the resulting colored layer 52", as the colorants of the coloring agent 30 become embedded throughout the coalesced/fused build material composition of the colored layer 52". The primer fusing agent 26, 26' may be particularly suitable for obtaining lighter colors or white.

It may also be desirable to selectively deposit the coloring agent 30 (with or without the detailing agent 42) in portion(s) of the non-patterned build material composition 16 which are adjacent to or surround the portion(s) 90 (which when coalesced/fused, will form the colored layer 52" along the top surface of object 44'). The colored build material composition 16 in the non-patterned portion(s) may become embedded in coalesced/fused build material composition along the sides or edges of the colored layer 52". The non-coalesced/non-fused, but embedded colored build material composition 16 may help to maintain saturation at the surface (of the colored layer 52") by providing a colored interface between the colored layer 52" and surrounding non-coalesced/non-fused build material composition 16.

After the primer fusing agent 26, 26' and the coloring agent 30 are selectively applied in the specific portion(s) 90 of the layer 88, the entire layer 88 of the build material composition 16 is exposed to electromagnetic radiation (shown as EMR Exposure between FIGS. 4G and 4H). In one example, the method 200 includes: exposing the third layer 88 to electromagnetic radiation to fuse the build material composition 16 in the at least the portion 90 of the third layer 88 to form a colored layer 52" having a colorant of the coloring agent 30 embedded therein.

The electromagnetic radiation is emitted from the radiation source 38, 38' in the manner previously described, with wavelengths suitable for the primer fusing agent 26, 26'. Exposure to electromagnetic radiation forms the colored layer 52", as shown in FIG. 4H, having colorants of the coloring agent 30 embedded therein.

While a single colored layer 52" is shown, it is to be understood that several colored layers 52" may be sequentially formed in contact with one another so that a color region (thicker than one voxel) is built up around the core layer(s) 46 in the final object 44'. The outermost colored layer 52" may form a one voxel deep shell, and the other colored layers may create the thicker color region. The levels of the primer fusing agent 26, 26' and the coloring agent 30 may be higher in the outermost colored layer 52", compared to other colored layers positioned closer to the core layer(s) 46, in order to increase color saturation at the exterior of the formed object 44'.

While not shown, the coloring agent 30 may be selectively applied to the colored layer 52". In one example, the method 200 includes: applying the coloring agent 30 on the colored layer 52".

The coloring agent 30 applied to the colored layer 52" may help to maintain saturation at the surface of the colored layer 52" by coloring the build material composition particles at the surface, whether these particles are coalesced/fused, or non-coalesced/non-fused and embedded in the coalesced/fused particles.

Also while not shown, it is to be understood that the detailing agent 42 may be selectively applied on the colored layer 52" with the coloring agent 30. In one example, the method 200 includes: applying a detailing agent 42 with the coloring agent 30.

Throughout the methods 100, 200, 300, the color of the coloring agent 30 that is applied will depend upon the desired color for the object 44' or at least the portion of the colored layer(s) 52, 52', 52" to be formed. As examples, black ink, cyan ink, magenta ink, and yellow ink may be applied alone or in combination to achieve a variety of colors.

It to be understood that the methods 100, 200, 300 may be modified so that the core fusing agent 28, rather than the primer fusing agent 26, 26', is applied with the coloring agent 30 to form the colored layers 52, 52', 52". The primer fusing agent 26, 26' may be particularly suitable for obtaining lighter colors or white. When the desired color for colored layer 52 is a darker color or black, the core fusing agent 28 may be applied with the coloring agent 30.

It to be further understood that the methods 100, 200, 300 may be modified so that the sacrificial layer 54 (with the coloring agent 30 thereon) and the outer colored layers 52, 52', 52" are not formed. In this modified form of the methods 100, 200, 300, the primer layer 48' would be formed first. In the resulting part, all of the primer layers 48', 48", 48''' would be exposed/visible, and thus would form the exterior of the part. In this example, the primer layers 48', 48", 48''' would form an outer white layer which encapsulates the core layer(s) 46. When the methods 100, 200, 300 are modified in this manner, the part that is formed is white or slightly tinted (depending upon the color of the primer fusing agent 26, 26').

In any of the examples of the methods 100, 200, 300, the presence of the titanium dioxide in the composite particles of the build material composition 16 may increase the opacity of the build material composition 16 (as compared to the opacity of a comparative build material including polyether block amide polymer and excluding titanium dioxide), which may increase the opacity of the primer layers 48', 48", 48'''. This increased opacity may improve the ability of the primer layers 48, 48', 48", 48''' to optically isolate the core layer(s) 46. As such, the L* value of the object 44' may be increased.

The method 400 to form the object 44" will now be discussed in reference to FIGS. 5A through 5C. It is to be understood that the method 400 may be another example of the method 100.

In FIG. 5A, a layer 94 of the build material composition 16 is applied on the build area platform 12. The layer 94 may be applied in the same manner as described above.

The layer 94 of the build material composition 16 may be exposed to pre-heating in the manner described herein.

After the layer 94 is applied, and in some instances is pre-heated, the primer fusing agent 26, 26' is selectively applied on portion(s) 96 of the build material composition 16 in the layer 94. While the primer fusing agent 26' is shown in FIGS. 5A and 5C, it is to be understood that the primer fusing agent 26 may be used instead of the primer fusing agent 26'.

The portion(s) 96 of the layer 94 will form the first layer 98 of the 3D object 44" (FIG. 5C) being formed. As such, the primer fusing agent 26, 26' is selectively dispensed on the layer 94 according to a pattern of a cross-section for the layer 98.

After the primer fusing agent 26, 26' is applied on the portion(s) 96, the entire layer 94 of the build material composition 16 is exposed to electromagnetic radiation (shown as EMR Exposure between FIGS. 5A and 5B) in the manner previously described.

In this example, the primer fusing agent 26, 26' sufficiently elevates the temperature of the build material composition 16 in portion 96 to a temperature within or above the melting range of the polyether block amide polymer included in the composite particles, allowing coalescing/fusing (e.g., thermal merging, melting, binding, etc.) of the build material composition 16 to take place. Exposure to electromagnetic radiation forms the layer 98, as shown in FIG. 5B.

It is to be understood that portions of the build material composition 16 that do not have the primer fusing agent 26, 26' applied thereto do not absorb enough energy to coalesce/fuse.

After the layer 98 is formed, additional layer(s) (e.g., 98', 98", 98''' shown in FIG. 5C) may be formed thereon to create an example of the 3D object 44" (shown in FIG. 5C). For example, to form the other layer 98', additional build material composition 16 may be applied on the layer 98. The primer fusing agent 26, 26' is then selectively applied on at least a portion of the additional build material composition 16, according to a pattern of a cross-section for the layer (e.g., 98') which is being formed. After the primer fusing agent 26, 26' is applied, the entire layer of the additional build material composition 16 is exposed to electromagnetic radiation in the manner previously described. The application of additional build material composition 16, the selective application of the primer fusing agent 26, 26', and the electromagnetic radiation exposure may be repeated a predetermined number of cycles to form the object 44".

In the example shown in FIGS. 5A through 5C, color may be imparted to the entire object 44" by applying the coloring agent 30 with the primer fusing agent 26, 26' in each of the portions of the respective build material layers that form layers 98, 98', 98", 98'''.

The methods 100, 400 may end at the formation of object 44" or color may be imparted to the top surface of the object 44". This is shown in FIG. 5C.

To impart color, a final layer 112 of the build material composition 16 is applied to the object 44". As shown in FIG. 5C, this layer 112 is applied to the outermost layer 98''' of the object 44". Prior to further processing, the layer 112 may be exposed to pre-heating in the manner previously described.

After the layer 112 is formed, and in some instances is pre-heated, the primer fusing agent 26, 26' and the coloring agent 30 are selectively applied on the same portion(s) 114 of the build material composition 16 in the layer 112. The primer fusing agent 26, 26' and the coloring agent 30 are selectively applied in a pattern of a cross-section for the colored layer that is to be formed (not shown). The color of the coloring agent 30 that is applied will depend upon the desired color for the part.

After the primer fusing agent 26, 26' and the coloring agent 30 are applied, the entire layer 112 of the build material composition 16 is exposed to electromagnetic radiation in the manner previously described. The primer fusing agent 26, 26' sufficiently elevates the temperature of the build material composition 16 in the portion 114 of the layer 112 to a temperature within or above the melting range of the polyether block amide polymer included in the composite particles, allowing coalescing/fusing (e.g., thermal merging, melting, binding, etc.) of the build material composition 16 (in contact with the primer fusing agent 26, 26') to take place. Exposure to electromagnetic radiation forms the colored layer (not shown), having colorants of the coloring agent 30 embedded therein.

It is to be understood that several colored layers may be sequentially formed in contact with one another so that a color region (thicker than one voxel) is built up on the layers 98, 98', 98", 98''' in the final part. The outermost colored layer may form a one voxel deep shell, and the other colored layers may create the thicker color region. The levels of the primer fusing agent 26, 26' and the coloring agent 30 may be higher in the outermost colored layer, as compared to other colored layers positioned closer to the layer 98''', in order to increase color saturation at the exterior of the formed object 44'''.

While not shown, the coloring agent 30 may be selectively applied to the colored layer. The coloring agent 30 applied to the colored layer may help to maintain saturation at the surface of the colored layer by coloring the build material composition particles at the surface, whether these particles are coalesced/fused or non-coalesced/non-fused and embedded in the coalesced/fused particles.

It is to be understood that the methods 100, 400 may also be modified similarly to the method 300 in order to form colored layers (e.g., 52 and 52') so that the part is completely encapsulated by colored layers.

Another example of the method 500 to form a 3D object will now be discussed in reference to FIGS. 6A and 6B. It is to be understood that the method 500 may be another example of the method 100.

In FIG. 6A, a layer 95 of the build material composition 16 is applied on the build area platform 12. The layer 95 may be applied in the same manner as described above.

The layer 95 of the build material composition 16 may be exposed to pre-heating in the manner described herein.

After the layer 95 is applied, and in some instances is pre-heated, the core fusing agent 28 is selectively applied on portion(s) 97 of the build material composition 16 in the layer 95. The portion(s) 97 of the layer 95 will form the first layer 99 of the 3D object being formed (not shown). As such, the core fusing agent 28 is selectively dispensed on the layer 95 according to a pattern of a cross-section for the layer 99.

After the core fusing agent 28 is applied on the portion(s) 97, the entire layer 95 of the build material composition 16 is exposed to electromagnetic radiation (shown as EMR Exposure between FIGS. 6A and 6B) in the manner previously described.

In this example, the core fusing agent 28 sufficiently elevates the temperature of the build material composition 16 in portion 97 to a temperature within or above the melting range of the polyether block amide polymer included in the composite particles, allowing coalescing/fusing (e.g., thermal merging, melting, binding, etc.) of the build material composition 16 to take place. Exposure to electromagnetic radiation forms the layer 99, as shown in FIG. 5B.

It is to be understood that portions of the build material composition 16 that do not have the core fusing agent 28 applied thereto do not absorb enough energy to coalesce/fuse.

After the layer 99 is formed, additional layer(s) may be formed thereon to create an example of the 3D object. For example, to form another layer, additional build material composition 16 may be applied on the layer 99. The core fusing agent 28 is then selectively applied on at least a portion of the additional build material composition 16, according to a pattern of a cross-section for the layer which is being formed. After the core fusing agent 28 is applied, the entire layer of the additional build material composition 16 is exposed to electromagnetic radiation in the manner previously described. The application of additional build material composition 16, the selective application of the core fusing agent 28, and the electromagnetic radiation exposure may be repeated a predetermined number of cycles to form the part.

In the example shown in FIGS. 6A and 6B, color may be imparted to the entire object 44" by applying the coloring agent 30 with the core fusing agent 28 in each of the portions of the respective build material layers that form layers of the part.

It is to be understood that the methods 100, 500 may also be modified similarly to the method 300 in order to form colored layers (e.g., 52, 52', 52") so that the part is completely encapsulated by colored layers.

In any of the examples disclosed herein, when the 3D object 44, 44', 44" is complete, it may be removed from the build material platform 12, and any non-coalesced/non-fused build material composition 16 may be removed from the 3D object 44, 44', 44".

In any of the methods 100, 200, 300, 400, 500 disclosed herein, the non-patterned and non-coalesced/non-fused build material composition 16 may be reclaimed to be reused as build material in the printing of another 3D object. The presence of the titanium dioxide in the composite particles of the build material composition 16 may reduce the yellowing of the build material composition 16 (as compared to the yellowing of a comparative build material including polyether block amide polymer and excluding titanium dioxide). As such, the reusability/recyclability of the non-patterned and non-coalesced/non-fused build material composition 16 may be improved. In some examples, the methods 100, 200, 300, 400, 500 may be accomplished in an air environment. As used herein, an "air environment" or an "environment containing air" refers to an environment that contains 20 vol % or more of oxygen.

Additionally, in any of the methods 100, 200, 300, 400, 500 disclosed herein, the presence of the titanium dioxide in the composite particles of the build material composition 16 may increase the $L^*$ value of the 3D object(s) formed therefrom (e.g., 3D object 44, 44', 44") (as compared to the $L^*$ value of 3D objects formed from a comparative build material including polyether block amide polymer and excluding titanium dioxide). This increase in the $L^*$ value may be desirable when the 3D object is to be a lighter color or white.

Printing System

Figure 7:
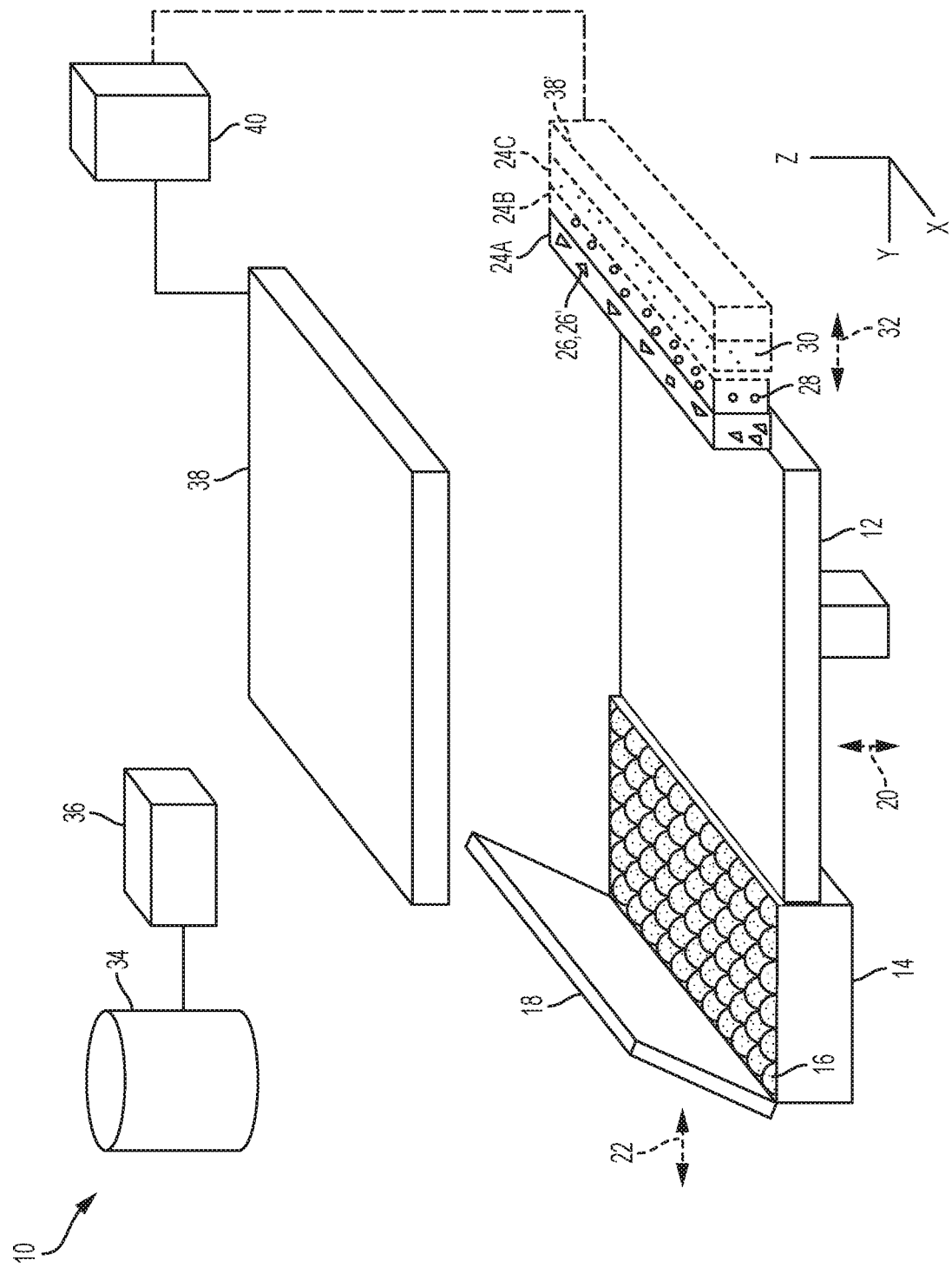
FIG. 7 is a simplified isometric and schematic view of an example of a 3D printing system disclosed herein.

Referring now to FIG. 7, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 7 may not be drawn to scale and thus, the 3D printing system 10 may have a different size and/or configuration other than as shown therein.

In an example, the three-dimensional (3D) printing system 10, comprises: a supply 14 of a build material composition 16 including composite particles of titanium dioxide at least partially coated with a polyether block amide polymer; a build material distributor 18; a supply of a fusing agent 26, 26', 28; a first applicator 24A, 24B for selectively dispensing the fusing agent 26, 26', 28; a source 38, 38' of electromagnetic radiation; a controller 36; and a non-transitory computer readable medium having stored thereon computer executable instructions to cause the controller 36 to: utilize the build material distributor 18 to dispense the build material composition 16; utilize the first applicator 24A, 24B to selectively dispense the fusing agent 26, 26', 28 on at least a portion of the build material composition 16; and utilize the source 38, 38' of electromagnetic radiation to expose the build material composition 16 to radiation to coalesce/fuse the at least the portion of the build material composition 16. Any example of the build material composition 16 may be used in the examples of the system 10.

In some examples, the 3D printing system 10 may further include a supply of another fusing agent 26, 26', 28; and another applicator 24A, 24B for selectively dispensing the other fusing agent 26, 26', 28. In these examples, the computer executable instructions may further cause the controller 36 to utilize the other applicator 24A, 24B to selectively dispense the other fusing agent 26, 26', 28.

In some other examples, the 3D printing system 10 may further include a supply of a coloring agent 30; and another applicator 24C for selectively dispensing the coloring agent 30. In these examples, the computer executable instructions may further cause the controller 36 to utilize the other applicator 24C to selectively dispense the coloring agent 30.

In still some other examples, the 3D printing system 10 may further include a supply of a detailing agent 42; and another applicator for selectively dispensing the detailing agent 42. In these examples, the computer executable instructions may further cause the controller 36 to utilize the other applicator to selectively dispense the detailing agent 42.

As shown in FIG. 7, the printing system 10 includes the build area platform 12, the build material supply 14 containing the build material composition 16 including the composite particles of titanium dioxide at least partially coated with the polyether block amide polymer, and the build material distributor 18.

As mentioned above, the build area platform 12 receives the build material composition 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material composition 16 between the build material distributor 18 and the build area platform 12. In some examples, the build material supply 14 may include a surface upon which the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material composition 16 from a storage location to a position to be spread onto the build area platform 12 or onto a previously formed layer of the 3D object.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 7, the printing system 10 may include the applicator 24A, which may contain the fusing agent 26, 26'. As also shown, the printing system 10 may further include the applicator 24B, which may contain the fusing agent 28, and/or the applicator 24C, which may contain the coloring agent 30. While not shown, the printing system 10 may further include another applicator (which may contain the detailing agent 42).

The applicator(s) 24A, 24B, 24C may be scanned across the build area platform 12 in the directions indicated by the arrow 32, e.g., along the y-axis. The applicator(s) 24A, 24B, 24C may be, for instance, a thermal inkjet printhead, a piezoelectric printhead, a continuous inkjet printhead, etc., and may extend a width of the build area platform 12. While the each applicator 24A, 24B, 24C is shown in FIG. 7 as a single applicator, it is to be understood that each applicator 24A, 24B, 24C may include multiple applicators that span the width of the build area platform 12. Additionally, the applicators 24A, 24B, 24C may be positioned in multiple printbars. The applicator(s) 24A, 24B, 24C may also be scanned along the x-axis, for instance, in configurations in which the applicator(s) 24A, 24B, 24C do/does not span the width of the build area platform 12 to enable the applicator(s) 24A, 24B, 24C to deposit the respective agents 26, 26', 28, 30, 42 over a large area of the build material composition 16. The applicator(s) 24A, 24B, 24C may thus be attached to a moving XY stage or a translational carriage (neither of which is shown) that moves the applicator(s) 24A, 24B, 24C adjacent to the build area platform 12 in order to deposit the respective agents 26, 26', 28, 30, 42 in predetermined areas of the build material layer(s) that has/have been formed on the build area platform 12 in accordance with the methods 100, 200, 300, 400, 500 disclosed herein. The applicator(s) 24A, 24B, 24C may include a plurality of nozzles (not shown) through which the respective agents 26, 26', 28, 30, 42 are to be ejected.

The applicator(s) 24A, 24B, 24C may deliver drops of the respective agents 26, 26' 28, 30, 42 at a resolution ranging from about 300 dots per inch (DPI) to about 1200 DPI. In other examples, the applicator(s) 24A, 24B, 24C may deliver drops of the respective agents 26, 26', 28, 30, 42 at a higher or lower resolution. The drop velocity may range from about 10 m/s to about 24 m/s and the firing frequency may range from about 1 kHz to about 48 kHz. In one example, the volume of each drop may be on the order of about 3 picoliters (pL) to about 18 pL, although it is contemplated that a higher or lower drop volume may be used. In some examples, the applicator(s) 24A, 24B, 24C is/are able to deliver variable drop volumes of the respective agents 26, 26', 28, 30, 42. One example of a suitable printhead has 600 DPI resolution and can deliver drop volumes ranging from about 6 pL to about 14 pL.

Each of the previously described physical elements may be operatively connected to a controller 36 of the printing system 10. The controller 36 may process print data that is based on a 3D object model of the 3D object/part to be generated. In response to data processing, the controller 36 may control the operations of the build area platform 12, the build material supply 14, the build material distributor 18, and the applicator(s) 24A, 24B, 24C. As an example, the controller 36 may control actuators (not shown) to control various operations of the 3D printing system 10 components. The controller 36 may be a computing device, a semiconductor-based microprocessor, a central processing unit (CPU), an application specific integrated circuit (ASIC), and/or another hardware device. Although not shown, the controller 36 may be connected to the 3D printing system 10 components via communication lines.

The controller 36 manipulates and transforms data, which may be represented as physical (electronic) quantities within the printer's registers and memories, in order to control the physical elements to create the 3D object. As such, the controller 36 is depicted as being in communication with a data store 34. The data store 34 may include data pertaining to a 3D object to be printed by the 3D printing system 10. The data for the selective delivery of the build material composition 16, the fusing agent 26, 26', 28, etc. may be derived from a model of the 3D object to be formed. For instance, the data may include the locations on each build material layer that the first applicator 24A, 24B is to deposit the fusing agent 26, 26', 28. In one example, the controller 36 may use the data to control the first applicator 24A, 24B to selectively apply the fusing agent 26, 26', 28. The data store 34 may also include machine readable instructions (stored on a non-transitory computer readable medium) that are to cause the controller 36 to control the amount of build material composition 16 that is supplied by the build material supply 14, the movement of the build area platform 12, the movement of the build material distributor 18, the movement of the applicator(s) 24A, 24B, 24C, etc.

As shown in FIG. 7, the printing system 10 may also include a source 38, 38' of electromagnetic radiation. In some examples, the source 38 of electromagnetic radiation may be in a fixed position with respect to the build material platform 12. The source 38 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 38' of electromagnetic radiation may be positioned to apply radiation to the build material composition 16 immediately after the fusing agent 26, 26', 28 has been applied thereto. In the example shown in FIG. 7, the source 38' of electromagnetic radiation is attached to the side of the applicators 24A, 24B, 24C which allows for patterning and heating/exposing to radiation in a single pass.

The source 38, 38' of electromagnetic radiation may emit radiation having wavelengths ranging from about 400 nm to about 4000 nm. As one example, the electromagnetic radiation may range from about 800 nm to about 1400 nm. As another example, the electromagnetic radiation may range from about 400 nm to about 1200 nm. As still another example, the electromagnetic radiation may be blackbody radiation with a maximum intensity at a wavelength of about 1100 nm. In some examples, the source 38, 38' of electromagnetic radiation may emit radiation having wavelengths slightly higher than 1400 nm (e.g., 1500 nm). The source 38, 38' of electromagnetic radiation may be infrared (IR) or near-infrared light sources, such as IR or near-IR curing lamps, IR or near-IR light emitting diodes (LED), or lasers with the desirable IR or near-IR electromagnetic wavelengths.

The source 38, 38' of electromagnetic radiation may be operatively connected to a lamp/laser driver, an input/output temperature controller, and temperature sensors, which are collectively shown as radiation system components 40. The radiation system components 40 may operate together to control the source 38, 38' of electromagnetic radiation. The temperature recipe (e.g., radiation exposure rate) may be submitted to the input/output temperature controller. During heating, the temperature sensors may sense the temperature of the build material composition 16, and the temperature measurements may be transmitted to the input/output temperature controller. For example, a thermometer associated with the heated area can provide temperature feedback. The input/output temperature controller may adjust the source 38, 38' of electromagnetic radiation power set points based on any difference between the recipe and the real-time measurements. These power set points are sent to the lamp/laser drivers, which transmit appropriate lamp/laser voltages to the source 38, 38' of electromagnetic radiation. This is one example of the radiation system components 40, and it is to be understood that other radiation source control systems may be used. For example, the controller 36 may be configured to control the source 38, 38' of electromagnetic radiation.

To further illustrate the present disclosure, examples are given herein. It is to be understood that these examples are provided for illustrative purposes and are not to be construed as limiting the scope of the present disclosure.

EXAMPLES

Example 1

An example of the build material composition disclosed herein (i.e., the first example build material composition) was prepared, and a comparative example of the build material composition was prepared. The first example build material composition included composite particles of titanium dioxide at least partially coated with a polyether block amide polymer. The build material composition included 2.5 wt % of titanium dioxide based on the total weight of the polyether block amide polymer. The comparative build material included another polyether block amide polymer and did not include any titanium dioxide.

The composite particles used as the first example build material composition and the polyether block amide polymer used as the comparative build material each had a relative solution viscosity at 25° C. between about 1.55 and about 1.85 using ASTM standards using m-cresol as the solvent.

The particle size distribution of the first example build material composition was measured using laser diffraction. The D10 value was determined to be about 60 µm; the D50 value was determined to be about 103 µm; and the D90 value was determined to be about 169 µm.

The first example build material composition and the comparative build material composition were each tested for reusability/recyclability. The first example build material composition and the comparative build material composition were each aged at 125° C. in an air environment (i.e., an environment an environment that contained 20 vol % or more of oxygen).

Figure 8:
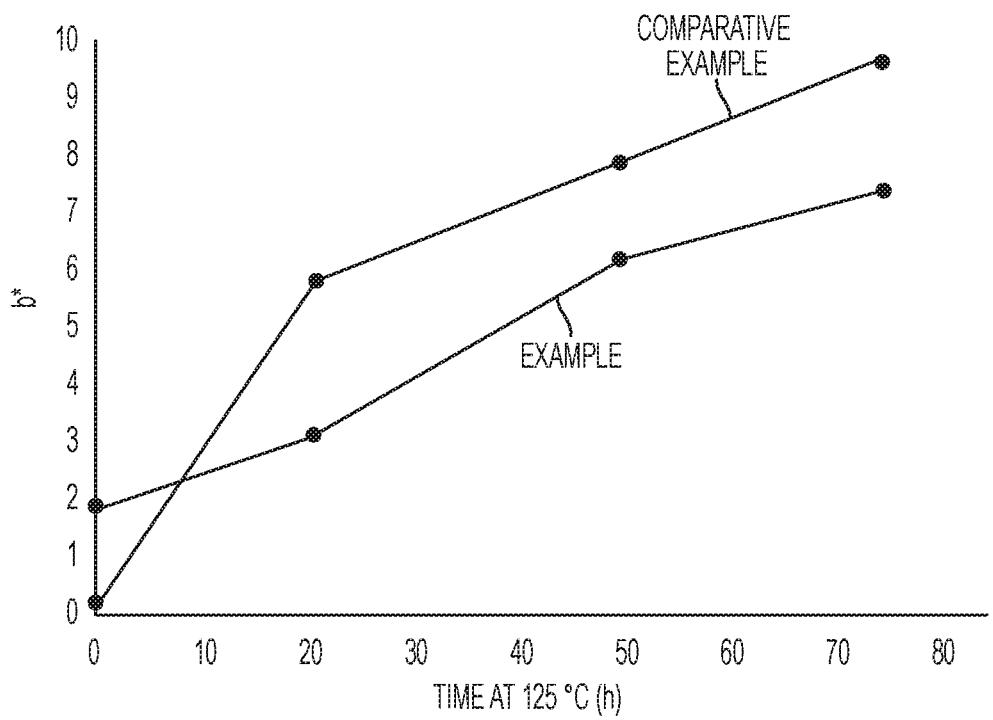
FIG. 8 is a graph showing b* value as a function of aging time for, respectively, an example build material composition (EXAMPLE), and a comparative build material composition (COMPARATIVE EXAMPLE), with the b* value shown on the y-axis, and the aging time (in hours) shown on the x-axis.

The b* value of each of the first example build material composition and the comparative build material composition was measured before the aging process and at several points during the aging process. The b* values measured for each of the first example build material composition (labeled "EXAMPLE") and the comparative build material composition (labeled "COMPARATIVE EXAMPLE") are shown in FIG. 8. In FIG. 8, the b* value is shown on the y-axis, and the time for which the build material composition was aged (in hours) is shown on the x-axis.

As shown in FIG. 8, both the first example build material composition and the comparative build material composition yellowed (i.e., the b* value increased) over time. However, FIG. 8 also shows that while the b* value of the first example build material composition was higher than the b* value of the comparative build material composition before the aging process, during and after the aging process, the b* values of the first example build material composition were lower than the b* values of the comparative build material composition. As such, the first example build material composition yellowed less than the comparative build material composition when exposed to high temperatures for prolonged time periods. This indicates that the presence of the titanium dioxide in the first example build material composition improved the reusability/recyclability of the first example build material composition.

The b* values of the first example build material composition shown in FIG. 8 also indicate that a desired color may be achieved with the first example build material composition, even when recycled over and over again without the addition of fresh build material composition.

Figure 9:
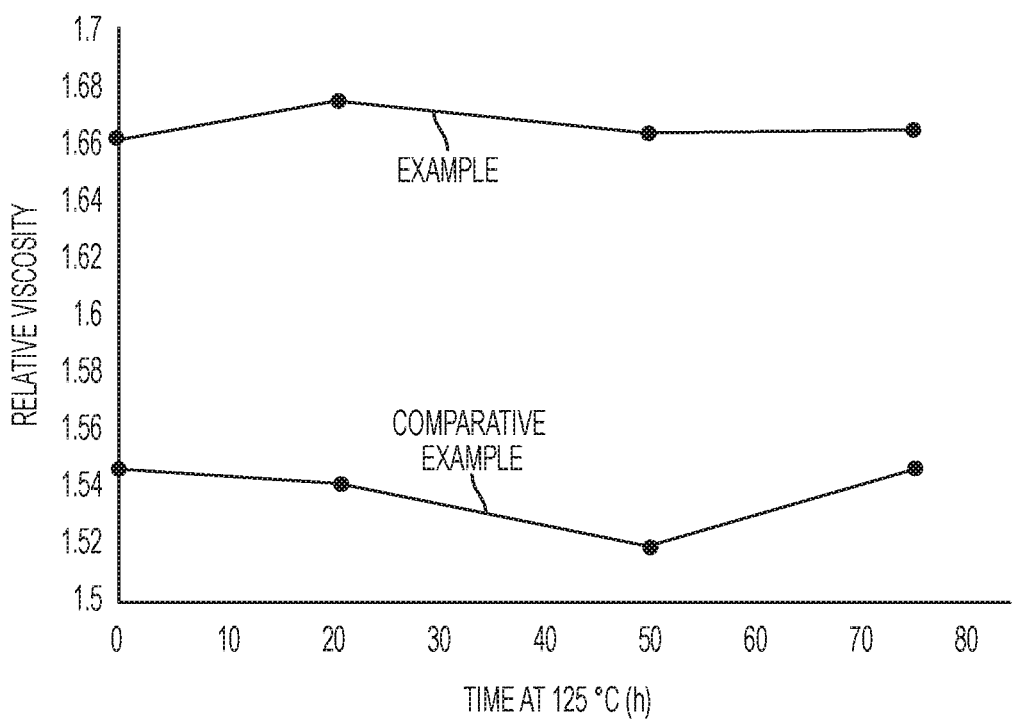
FIG. 9 is a graph showing relative solution viscosity (i.e., relative viscosity) as a function of aging time for, respectively, an example build material composition (EXAMPLE), and a comparative build material composition (COMPARATIVE EXAMPLE), with the relative solution viscosity shown on the y-axes, and the aging time (in hours) shown on the x-axis.

The relative solution viscosity (at ambient temperature) of each of the first example build material composition and the comparative build material composition was also measured before the aging process and at several points during the aging process. The relative solution viscosity values for each of the first example build material composition (labeled "EXAMPLE") and the comparative build material composition (labeled "COMPARATIVE EXAMPLE") are shown in FIG. 9. In FIG. 9, the relative solution viscosity is shown on the y-axis, and the time for which the build material composition was aged (in hours) is shown on the x-axis.

FIG. 9 shows that the relative solution viscosity of the first example build material composition remained substantially unchanged over time when exposed to 125° C. This indicates that the first example build material composition is relatively stable up to 125° C. for about 75 hours. This indicates that the first example build material composition has good reusability/recyclability. The relative solution viscosity values shown in FIG. 9 indicate that the first example build material composition may be reused/recycled without mixing the recycled build material composition with any fresh build material composition (i.e., 100% recycled build material may be used). Although, given that build material composition is used as printing occurs, the reused/recycled build material composition may be mixed with fresh build material composition during subsequent print cycles. For example, a weight ratio of recycled build material composition to fresh build material composition of 90:10 or lower may be used. The mixture of recycled and fresh build material composition may also be used to achieve a desired aesthetic.

Example 2

Two additional examples of the build material composition disclosed herein (i.e., the second example build material composition and the third example build material composition) were prepared. The additional example build material compositions included composite particles of titanium dioxide at least partially coated with a polyether block amide polymer. The same titanium dioxide and the same polyether block amide polymer that was used in the first example build material composition were used in the additional example build material compositions. The second example build material composition included 1 wt % of titanium dioxide based on the total weight of the polyether block amide polymer. The third example build material composition included 0.5 wt % of titanium dioxide based on the total weight of the polyether block amide polymer.

A white part was printed using each of the first example build material composition (from Example 1), the second example build material composition, the third example build material composition, and the comparative build material composition (from Example 1). Each white part included core layers surrounded by primer layers, and was printed on a small testbed 3D printer using an example core fusing agent including carbon black as the active material and an example primer fusing agent including CTO nanoparticles as the plasmonic resonance absorber.

The white part printed using the comparative build material composition appeared to be dark grey. The white parts printed with the example build material compositions were lighter than the white part printed using the comparative build material composition. The white parts printed with the example build material compositions became whiter as the concentration of the titanium dioxide included in the example build material composition increased.

Additionally, a black part was printed using each of the example build material compositions and the comparative build material composition. Each black part included consisted of core layers, and was printed on a small testbed 3D printer using the example core fusing agent (including carbon black as the active material).

While the color of the black parts lightened as the concentration of the titanium dioxide included in the build material increased, all of the black parts printed with the example build material compositions appeared to be black or dark grey.

Figure 10:
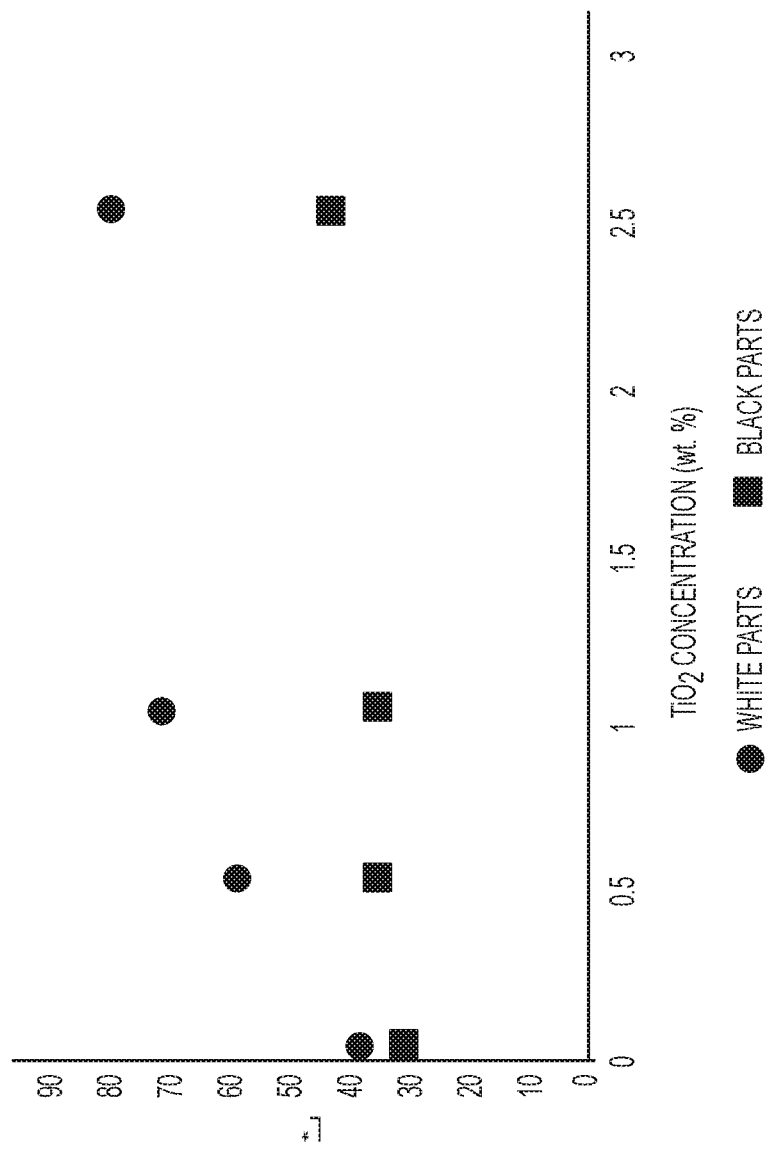
FIG. 10 depicts a graph showing the L* value as a function of the $TiO_2$ concentration for parts printed using example 3D printing methods and parts printed using comparative 3D printing methods, with the L* value shown on the y-axis, and the $TiO_2$ concentration (in wt %) shown on the x-axis.

The L* value of each white part and each black part was measured. The L* value measured for each part is shown in FIG. 10. In FIG. 10, the L* value is shown on the y-axis, and the concentration (in wt %) of the titanium dioxide ($TiO_2$) included in the build material used to print the parts is shown on the x-axis.

As shown in FIG. 10, the part lightened (i.e., the L* value increased) as the concentration of the titanium dioxide included in the build material increased. This indicates that the presence of the titanium dioxide in example build material compositions increased the L* values of the example build material compositions.

Several magenta parts and several yellow parts were printed using each of the example build material compositions and the comparative build material composition. Several cyan parts were also printed using each of the example build material compositions. Each magenta part, each cyan part, and each yellow part included core layers surrounded by primer layers, which were surrounded by colored layers. Each magenta part, each cyan part, and each yellow part was printed on a small testbed 3D printer using the example core fusing agent (including carbon black as the active material), the example primer fusing agent (including CTO nanoparticles as the plasmonic resonance absorber), and an example coloring agent. For each magenta part, each cyan part, and each yellow part, the coloring agent was used to print sacrificial layers adjacent to the colored layers so that some of the colored particle in the sacrificial layer would become embedded in coalesced/fused build material composition of the part layer. The coloring agent used to print the magenta part included a magenta colorant; the coloring agent used to print the cyan part included a cyan colorant; and the coloring agent used to print the yellow part included a yellow colorant. Each of the coloring agents included the respective pigments, as well as co-solvent(s), surfactant(s), anti-kogation agent(s), biocide(s), and a balance of water.

The magenta, cyan, and yellow parts printed using the comparative build material composition were very dark (i.e., the parts exhibited grey or black shades along with the respective colors). The magenta, cyan, and yellow parts printed using the example build material compositions were lighter (they exhibited less or no grey or black) and more vibrant than the parts printed using the comparative build material composition. The magenta, cyan, and yellow parts printed using the example build material compositions were vibrant and had high gamut.

Example 3

Two additional examples of the build material composition disclosed herein (i.e., the fourth and fifth example build material compositions) were prepared.

The fourth example build material composition included composite particles of titanium dioxide at least partially coated with a polyether block amide polymer. The composite particles used in the fourth build material composition had a relative solution viscosity at 25° C. of about 1.75 using ASTM standards using m-cresol as the solvent. The fourth example build material included 2.5 wt % of titanium dioxide based on the total weight of the polyether block amide polymer.

The fifth example build material composition included composite particles of titanium dioxide at least partially coated with a polyether block amide polymer. The composite particles used in the fifth build material composition had a relative solution viscosity at 25° C. of about 1.55 to 1.6 using ASTM standards using m-cresol as the solvent. The fifth example build material included 2.5 wt % of titanium dioxide based on the total weight of the polyether block amide polymer.

Several XY dogbones (printed in the XY orientation) and several Z dogbones (printed in the Z orientation) were printed with each of the first example build material composition (from Example 1) and the fourth example build material composition. Each dogbone was printed on a small testbed 3D printer with the example primer fusing agent (from Example 2).

The ultimate tensile strength and the elongation at break of all of the XY dogbones were measured using DIN standard 53504 (S2); and the ultimate tensile strength and the elongation at break of all of the Z dogbones were measured using ASTM D638 (Type V). The average value for the ultimate tensile strength and the elongation at break in the XY print orientation (i.e., for the XY dogbones) and the Z print orientation (i.e., for the Z dogbones) are shown in Table 1. In Table 1, the dogbones are identified by the build material composition used to form the dogbones.

TABLE 1

| | Fourth example build material composition | Fifth example build material composition |
|---|---|---|
| Ultimate tensile strength of XY dogbones (XY print orientation) (MPa) | ~11.12 | ~9.41 |
| Elongation at break of XY dogbones (XY print orientation) (%) | ~570 | ~365 |
| Ultimate tensile strength of Z dogbones (Z print orientation) (MPa) | ~9.4 | ~6.35 |
| Elongation at break of Z dogbones (Z print orientation) (%) | ~298 | ~97.5 |

As shown in Table 1, the ultimate tensile strength and the elongation at break of the XY and Z dogbones formed from the fourth example build material composition were greater than the ultimate tensile strength and the elongation at break of, respectively, the XY and Z dogbones formed from the fifth example build material composition. This indicates that the ultimate tensile strength and the elongation at break were improved when the composite particles had the higher solution viscosity.

Several additional test specimens (buttons printed in the XY print orientation) were printed with the fourth example build material composition. The compression set (22 hours at 70° C.), elastic rebound, and Shore D hardness of these additional test specimens were measured. The compression set (22 hours at 70° C.) was measured using ASTM standard D395. The elastic rebound was measured using DIN standard 53512. The Shore D hardness was measured using ASTM standard D2240. The average value for each of these measurements is shown in Table 2.

TABLE 2

| | Fourth example build material composition |
|---|---|
| Compression set (%) | 79 |
| Elastic rebound (%) | 65 |
| Hardness | 40 |

It is to be understood that the ranges provided herein include the stated range and any value or sub-range within the stated range. For example, from about 0.5 wt % to about 4 wt % should be interpreted to include not only the explicitly recited limits of from about 0.5 wt % to about 4 wt %, but also to include individual values, such as about 1 wt %, about 1.67 wt %, about 2.74 wt %, about 3 wt %, about 3.5 wt %, etc., and sub-ranges, such as from about 1 wt % to about 3 wt %, from about 0.5 wt % to about 2.7 wt %, from about 1.71 wt % to about 3.79 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing kit, comprising:
   a build material composition including composite particles of titanium dioxide nanoparticles at least partially coated with a polyether block amide polymer, wherein the titanium dioxide nanoparticles have a particle size ranging from about 60 nm to about 800 nm; and
   a fusing agent to be applied to at least a portion of the build material composition during 3D printing, the fusing agent including an energy absorber to absorb electromagnetic radiation to coalesce the composite particles in the at least the portion.

2. The 3D printing kit as defined in claim 1 wherein the titanium dioxide nanoparticles are present in an amount ranging from about 0.5 wt % to about 10 wt % based on a total weight of the polyether block amide polymer.

3. The 3D printing kit as defined in claim 1, further comprising a coloring agent selected from the group consisting of a black ink, a cyan ink, a magenta ink, and a yellow ink.

4. The 3D printing kit as defined in claim 1, further comprising a detailing agent including a surfactant, a co-solvent, and water.

5. The 3D printing kit as defined in claim 1 wherein the fusing agent is a core fusing agent and the energy absorber has absorption at least at wavelengths ranging from 400 nm to 780 nm.

6. The 3D printing kit as defined in claim 5, further comprising a primer fusing agent including an energy absorber comprising an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof.

7. The 3D printing kit as defined in claim 1 wherein the fusing agent is a primer fusing agent and the energy absorber is an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof.

8. The 3D printing kit as defined in claim 1 wherein the composite particles have a relative solution viscosity at 25° C. ranging from about 1.60 to about 1.85, based on American Society for Testing Materials (ASTM) standards using m-cresol as solvent.

9. The 3D printing kit as defined in claim 1 wherein each of the composite particles has a particle size ranging from about 10 μm to about 200 μm.

10. The 3D printing kit as defined in claim 1, wherein the composite particles are formed by:
mixing the titanium dioxide nanoparticles with the polyether block amide polymer to form a mixture;
heating the mixture to melt the polyether block amide polymer;
extruding the mixture to form a compounded material; and
grinding the compounded material.

11. A method for three-dimensional (3D) printing, comprising:
applying a build material composition to form a build material layer, the build material composition including composite particles of titanium dioxide nanoparticles at least partially coated with a polyether block amide polymer, wherein the titanium dioxide nanoparticles have a particle size ranging from about 60 nm to about 800 nm;
based on a 3D object model, selectively applying a fusing agent on at least a portion of the build material layer; and
exposing the build material layer to electromagnetic radiation to coalesce the at least the portion to form a layer of a 3D object.

12. The method as defined in claim 11, further comprising:
iteratively applying individual build material layers of the build material composition;
based on the 3D object model, selectively applying the fusing agent to at least some of the individual build material layers to define individually patterned layers, wherein the fusing agent is selected from the group consisting of a core fusing agent, a primer fusing agent, or both the core fusing agent and the primer fusing agent; and
iteratively exposing the individually patterned layers to the electromagnetic radiation to form individual object layers, wherein each of the individual object layers is selected from the group consisting of a core layer, a primer layer, or a layer including a core portion and a primer portion.

13. The method as defined in claim 11, further comprising forming the composite particles by:
mixing the titanium dioxide nanoparticles with the polyether block amide polymer to form a mixture;
heating the mixture to melt the polyether block amide polymer;
extruding the mixture to form a compounded material; and
grinding the compounded material.

14. A method for three-dimensional (3D) printing, comprising:
based on a 3D object model, selectively applying a core fusing agent on at least a portion of a first layer of a build material composition, the build material composition including composite particles of titanium dioxide nanoparticles at least partially coated with a polyether block amide polymer, wherein the titanium dioxide nanoparticles have a particle size ranging from about 60 nm to about 800 nm;
exposing the first layer to electromagnetic radiation to fuse the build material composition in the at least the portion of the first layer to form a core layer;
applying a second layer of the build material composition on the core layer;
based on the 3D object model, selectively applying a primer fusing agent on at least a portion of the second layer, the primer fusing agent including an energy absorber comprising an inorganic pigment selected from the group consisting of lanthanum hexaboride, tungsten bronzes, indium tin oxide, aluminum zinc oxide, ruthenium oxide, silver, gold, platinum, iron pyroxenes, modified iron phosphates ($A_xFe_yPO_4$), modified copper pyrophosphates ($A_xCu_yP_2O_7$), and combinations thereof; and
exposing the second layer to electromagnetic radiation to fuse the build material composition in the at least the portion of the second layer to form a primer layer.

15. The method as defined in claim 14, further comprising:
applying a third layer of the build material composition on the primer layer;
based on the 3D object model, selectively applying a coloring agent and i) the core fusing agent or ii) the primer fusing agent on at least a portion of the third layer; and
exposing the third layer to electromagnetic radiation to fuse the build material composition in the at least the portion of the third layer to form a colored layer having a colorant of the coloring agent embedded therein.

16. The method as defined in claim 15, further comprising applying the coloring agent on the colored layer.

17. The method as defined in claim 16, further comprising applying a detailing agent with the coloring agent.

18. The method as defined in claim 14, further comprising forming the composite particles by:
mixing the titanium dioxide nanoparticles with the polyether block amide polymer to form a mixture;
heating the mixture to melt the polyether block amide polymer;
extruding the mixture to form a compounded material; and
grinding the compounded material.

* * * * *